(12) United States Patent
Yang et al.

(10) Patent No.: US 7,370,163 B2
(45) Date of Patent: May 6, 2008

(54) ADAPTIVE CACHE ENGINE FOR STORAGE AREA NETWORK INCLUDING SYSTEMS AND METHODS RELATED THERETO

(75) Inventors: Ken Q. Yang, Saunderstown, RI (US); Ming Zhang, Attleboro, MA (US); Liu Yinan, Kingston, RI (US)

(73) Assignee: Gemini Storage, Providence, RI (US)

( * ) Notice: Subject to any disclaimer, the term of this patent is extended or adjusted under 35 U.S.C. 154(b) by 227 days.

(21) Appl. No.: 11/054,933

(22) Filed: Feb. 9, 2005

(65) Prior Publication Data
US 2005/0243609 A1 Nov. 3, 2005

Related U.S. Application Data

(60) Provisional application No. 60/622,215, filed on Oct. 25, 2004.

(51) Int. Cl.
*G06F 12/00* (2006.01)
*G11C 5/00* (2006.01)

(52) U.S. Cl. .................. 711/162; 711/118; 711/154; 365/189.05

(58) Field of Classification Search ........... 711/100, 711/118, 154, 162; 365/189.05
See application file for complete search history.

(56) References Cited

U.S. PATENT DOCUMENTS 5,297,258 A 3/1994 Hale et al.
5,341,381 A 8/1994 Fuller
5,418,921 A 5/1995 Cortney et al.
5,499,367 A 3/1996 Bamford et al.

(Continued)

FOREIGN PATENT DOCUMENTS

WO WO 97/26600 7/1997

(Continued)

OTHER PUBLICATIONS

Patterson, Hugo. "SnapMirror: File System Based Asynchronous Mirroring for Disaster Recovery". Proceedings of the FAST 2002 Conference on File and Storage Technologies. Jan. 2002. pp. 1-13.*

(Continued)

*Primary Examiner*—Tuan V. Thai
(74) *Attorney, Agent, or Firm*—George Nicholas Chacias; Edwards Angell Palmer & Dodge LLP

(57) ABSTRACT

Featured is a data storage back-up system for replication, mirroring and/or backing-up data including one or more first and second data storage devices that embody iSCSI, FC or alike principals and that are operably coupled to each other preferably via a WAN. The first data storage device is configured and arranged so there are two writes of data, one write to a persistent storage device from which reads are done and another write to a SAPS device wherein the data is saved using log-structured file system (LSF) techniques. After saving data to the First storage device, the data logs in the SAPS device are communicated to the second data storage device whereat a de-staging process is conducted so as to de-stage the data logs and write the de-staged data to a persistent storage device in the second data storage device.

29 Claims, 35 Drawing Sheets

U.S. PATENT DOCUMENTS

| | | | |
|---|---|---|---|
| 5,522,032 A | 5/1996 | Franaszek et al. | |
| 5,530,948 A | 6/1996 | Islam | |
| 5,537,534 A | 7/1996 | Voigt et al. | |
| 5,574,882 A | 11/1996 | Menon et al. | |
| 5,594,862 A | 1/1997 | Winkler et al. | |
| 5,640,506 A | 6/1997 | Duffy | |
| 5,734,814 A | 3/1998 | Corbin et al. | |
| 5,754,756 A | 5/1998 | Watanabe et al. | |
| 5,754,888 A * | 5/1998 | Yang et al. | 710/52 |
| 5,774,643 A | 6/1998 | Lubbers et al. | |
| 5,901,327 A | 5/1999 | Ofek | |
| 5,964,895 A | 10/1999 | Kim et al. | |
| 6,035,347 A | 3/2000 | Beardsley et al. | |
| 6,052,822 A | 4/2000 | Kim et al. | |
| 6,144,999 A | 11/2000 | Khaldidi et al. | |
| 6,148,368 A | 11/2000 | DeKoning | |
| 6,158,019 A * | 12/2000 | Squibb | 714/13 |
| 6,163,856 A | 12/2000 | Dion et al. | |
| 6,173,361 B1 | 1/2001 | Taketa | |
| 6,223,301 B1 | 4/2001 | Santeler et al. | |
| 6,243,795 B1 | 6/2001 | Yang et al. | |
| 6,298,415 B1 | 10/2001 | Riedle | |
| 6,412,045 B1 | 6/2002 | DeKoning et al. | |
| 6,430,702 B1 | 8/2002 | Santeler et al. | |
| 6,460,122 B1 | 10/2002 | Otterness et al. | |
| 6,480,970 B1 | 11/2002 | DeKoning et al. | |
| 6,516,380 B2 | 2/2003 | Kenchammmana-Hoskote et al. | |
| 6,523,087 B2 | 2/2003 | Busser | |
| 6,542,960 B1 | 4/2003 | Wong et al. | |
| 6,553,511 B1 | 4/2003 | DeKoning et al. | |
| 6,606,629 B1 | 8/2003 | DeKoning et al. | |
| 6,711,703 B2 | 3/2004 | MacLaren et al. | |
| 6,715,116 B2 | 3/2004 | Lester et al. | |
| 6,795,518 B1 | 9/2004 | Armangau et al. | |
| 7,149,858 B1 * | 12/2006 | Kiselev | 711/162 |
| 2002/0016827 A1 * | 2/2002 | McCabe et al. | 709/213 |
| 2002/0103983 A1 | 8/2002 | Rege et al. | |
| 2002/0169925 A1 | 11/2002 | Achiwa et al. | |
| 2004/0117344 A1 | 6/2004 | Yang | |
| 2004/0267902 A1 * | 12/2004 | Yang | 709/217 |

FOREIGN PATENT DOCUMENTS

WO     WO 03/017598 A1     2/2003

OTHER PUBLICATIONS

"hp OpenView Continuous Access Storage Appliance: designed for no single point of failure in the data path". Hewlett Packard. Apr. 2003. pp. 1-8.*

Ji. Minwen et al., Seneca: remote mirroring done write, Proceedings of USENIX Technical Conference (San Antonio, TX), Jun. 2003, pp. 253-268.

* cited by examiner

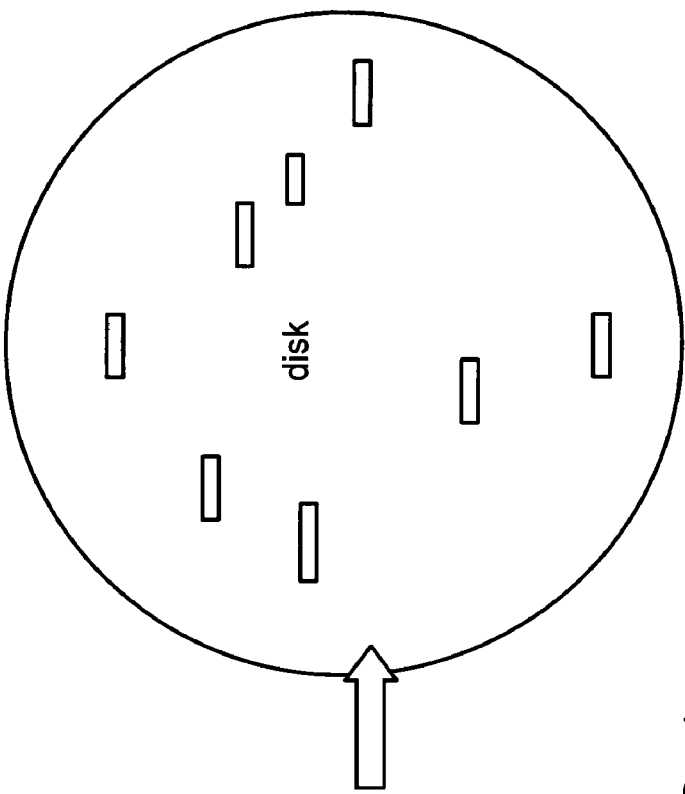
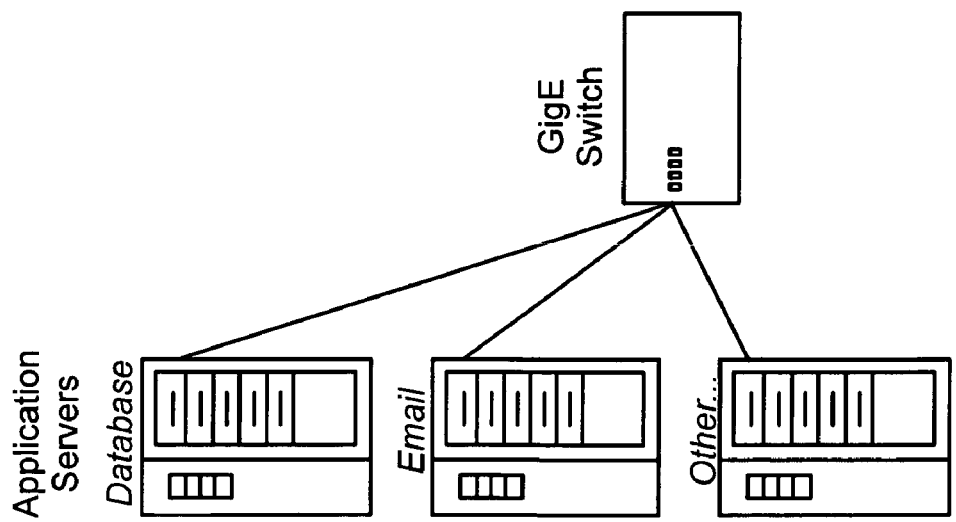
FIG. 1
PRIOR ART

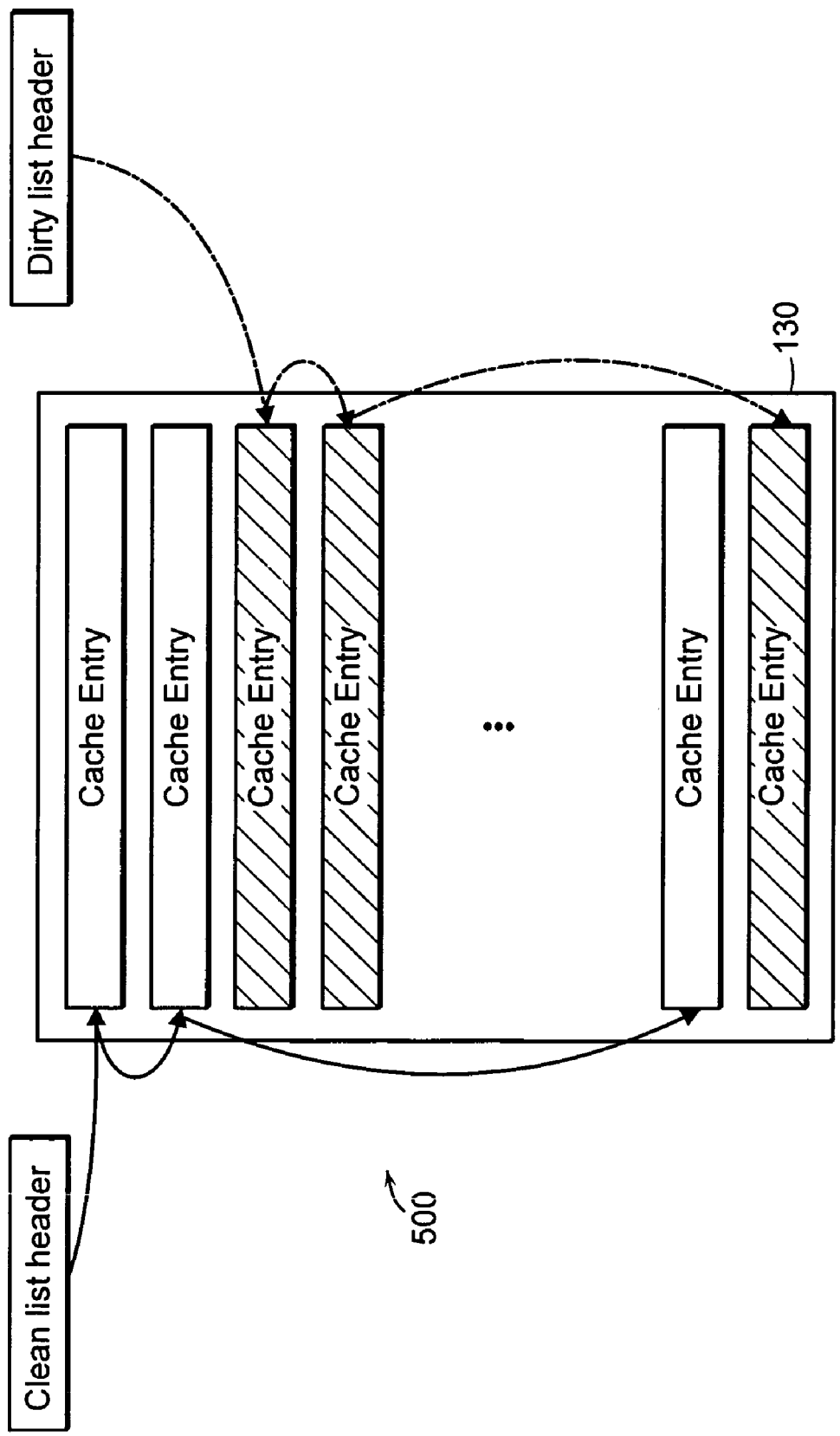

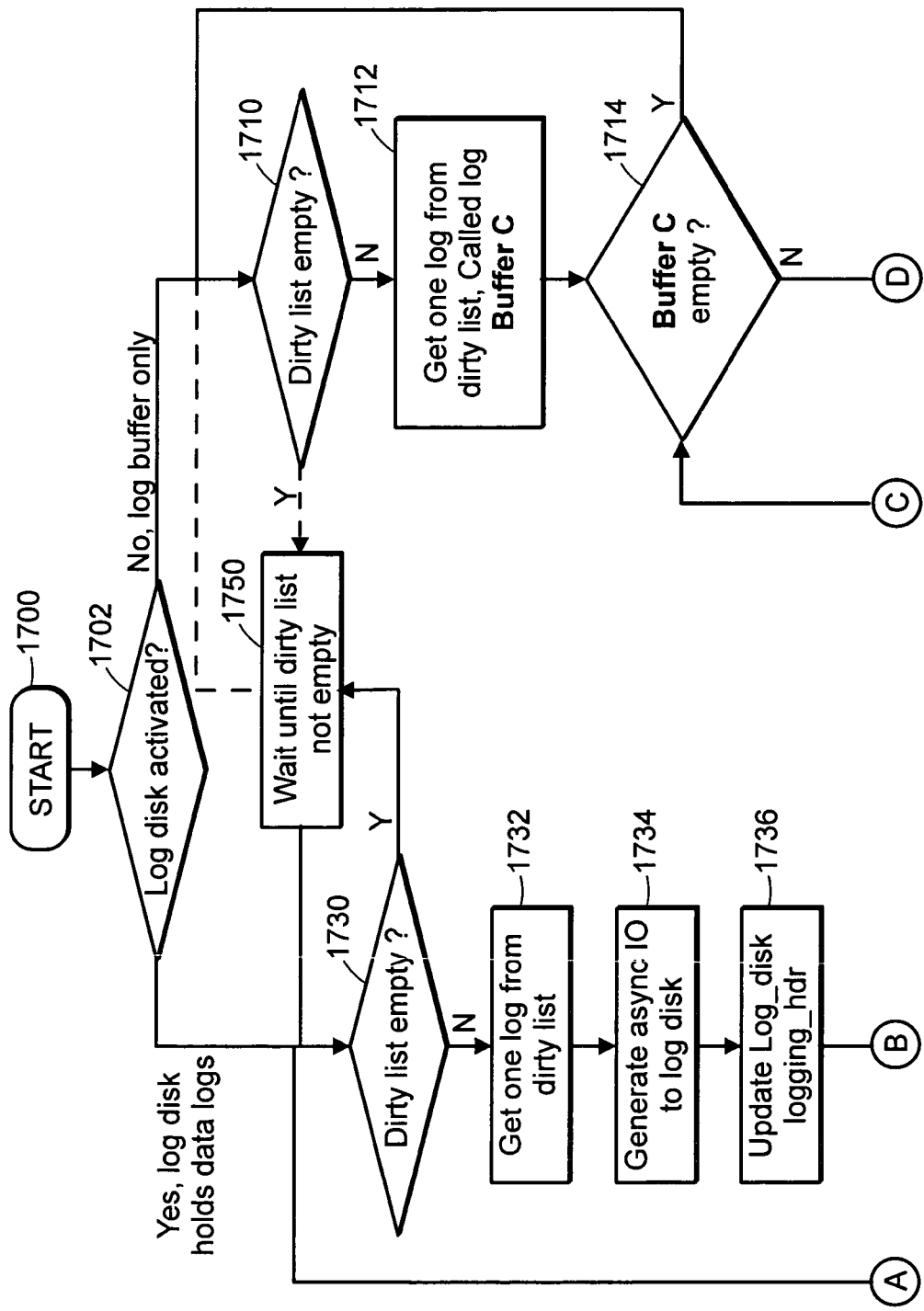

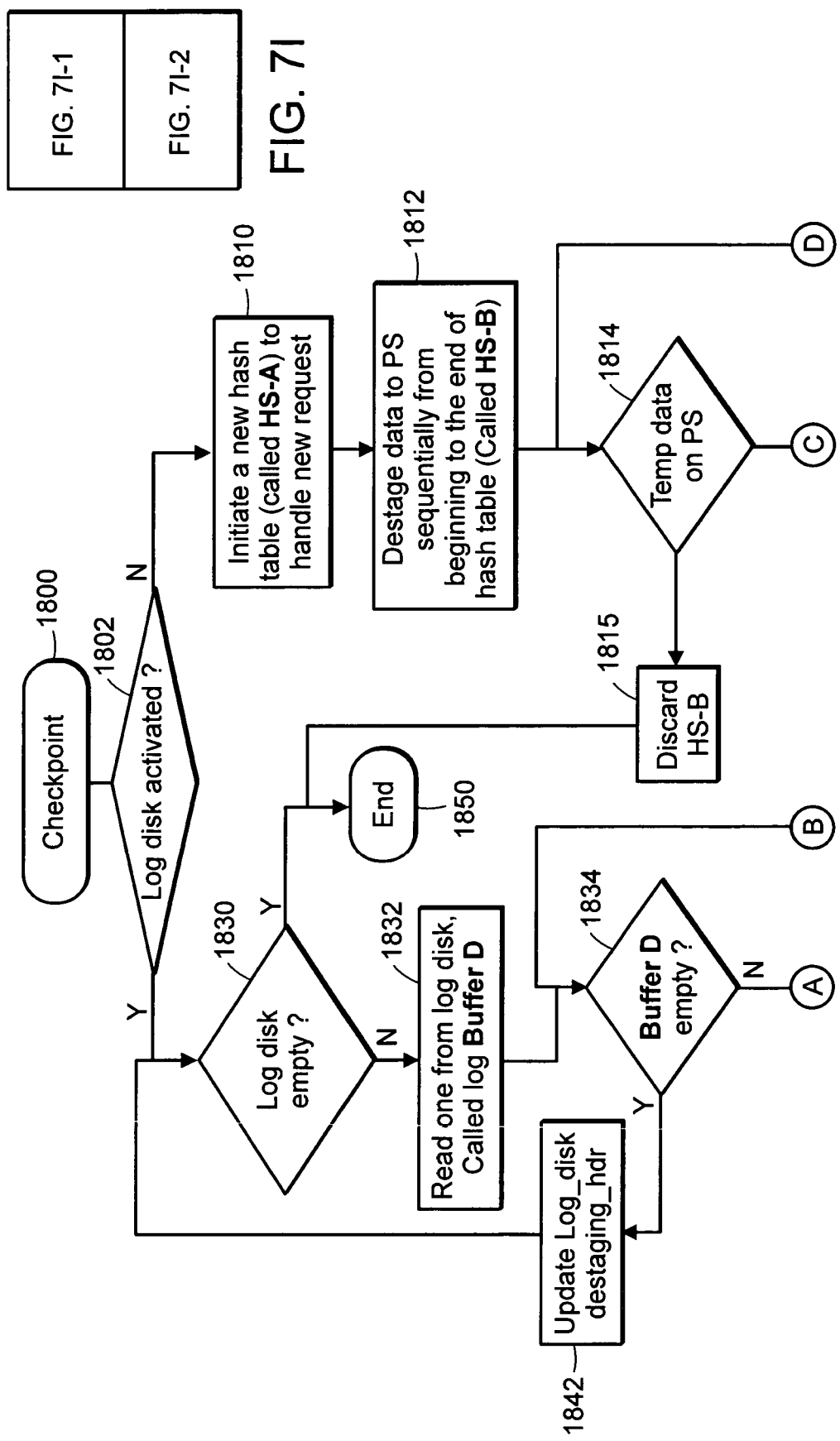

Queuing model for iSCSI Storage System

ADAPTIVE CACHE ENGINE FOR STORAGE AREA NETWORK INCLUDING SYSTEMS AND METHODS RELATED THERETO

This application claims the benefit of U.S. Provisional Application No. 60/622,215 filed Oct. 25, 2004, the teachings of which are incorporated herein by reference.

FIELD OF INVENTION

The present invention generally relates to devices, systems and methods for data storage, more particularly to devices, systems and methods for data replication, mirroring, and/or backup of storage systems, and even more particularly to devices, systems and methods for data replication, mirroring and/or back-up of storage systems that in part embody Log-structured File System (LFS) techniques/principles.

BACKGROUND OF THE INVENTION

The information or data of a company are important assets of the company's business. Also important is making such data or information of the company continuously available. Therefore, and is known to those skilled in that art, storage replication, mirroring and/or back-up systems are desirable so as to make such data or information continuously available; in particular in the event such data or information becomes lost or corrupted as a result of a failure of a computer system or primary storage system. In addition, there also is a need to maintain back-ups of such data and information at locations that are remote from the place of business in order to prevent a catastrophe, whether natural (e.g., weather) or man-made, from causing a loss of such data or information.

Thus, remote data mirroring has become increasingly important as organizations and businesses depend more and more on digital information. It has been widely deployed in the financial industry and other businesses for tolerating failures and disaster recovery. Since the occurrence of events over the last several years, replicating data to a far-away back-up site has taken on new urgency with the heightened awareness of business resiliency requirements. The federal government also has made indications about requiring companies in some industries to back up data to an out-of-region location, although exact distance requirements were delayed until recently.

There are many remote replication/mirroring products in the market today. These products can generally be classified into two broad categories. One category is block-level remote mirroring for data storages in an FC-SAN (Fiber Channel-Storage Area Network). The other category is file-based remote mirroring over the Internet, which product is generally used for small to medium size businesses.

Traditional block-level remote mirroring has been done using and through dedicated/leased network connections and is managed on a storage area network based on Fibre Channel protocol (FC-SAN). Such leased network connections are usually very costly. For example, the cost of leasing a WAN connection with speed of 155 Mbps could cost about $460,000/year, which is in addition to the high cost for hardware/software installations and management of FC-SAN. Consequently, large companies such as Fortune 500 and similar businesses have adopted such remote mirroring, but as a practical matter it has not been adopted by small to medium size businesses. Mirroring products in this market sector include EMC's SRDF (Symmetrix Remote Data Facility), IBM's XRC (Extended Remote Copy) HP's XP arrays and CASA (continuous access storage appliance), Veritas' Volume Replicator, and NetApp's SnapMirror, to list a few.

These products differ from each other depending on how closely synchronized the mirrored data copies are, how to propagate file changes, and when to acknowledge the host, etc. For example, EMC's SRDF prefers synchronous mode while allowing a certain degree of asynchrony for better performance, and HP's CASA and NetApp's SnapMirror use an asynchronous mode that allows mirrored copies to be different from primary copies for a controllable short period of time. There also are different variations for such products targeted to this market sector.

Besides high bandwidth network connections and specialized network protocol, remote data mirroring requires high-speed data buffers to ensure adequate performance. Cache (e.g., flash memory/NVRAM, battery backed DRAM/SRAM) has been traditionally used in data storage systems that have the functionality of asynchronous remote mirroring. Because of traffic fluctuations on WAN networks, the cache has to be sufficiently large to allow a smooth mirroring without affecting application server performance. In one product for example, tens of Gigabyte of battery backed RAM is provided to cache the data to be mirrored.

Such large RAM caches are generally prohibitively expensive and consequently increase the storage cost dramatically as compared to storage systems that embody hard disk drives. As a result, they are suitable only to large corporations such as Fortune 500 companies. One company has recently released some products to meet the storage needs of small to medium size companies. The manufacturer has indicated that as to the mirroring functionality, however, there could be a significant performance impact with the write-intent-log and for this reason the use of the write-intent-log is not enabled by default.

In addition to being expensive, using RAM as a cache for the write operations raises reliability issues because RAM is a volatile memory. In contrast, disks such as hard magnetic disks are nonvolatile memories and the technologies have developed very rapidly in the past two decades making disks highly reliable and very inexpensive with extremely high density. The speed of disk operations, however, is limited by necessary mechanical operations including seek-time (5-10 ms) and rotation latency (5-10 ms) for each block access. Attempts have been made to make disk operations faster by changing the data layout on disks.

Although storage products that use disk as a write cache have not been seen in commercial applications, there does exist research and studies that are directed to speeding up disk operations. One of the more important works in this area is the Log-Structured File system (LSF) that buffers small writes in a RAM to form large logs of data that is to be subsequently and sequentially written into a disk (sometimes referred to as the log disk), thereby eliminating many random seeks and rotation latency. While the LSF system has a great potential to improve write performance, it has not been commercially successful to date and is limited to only academic research because of its requirements of operating system (OS) change, expensive cleaning algorithm, and limited read performance.

There has been proposed in U.S. Pat. No. 5,297,258 to Hale et al, U.S. Pat. No. 5,754,888 to Yang et al., and published US application No. 2002/0103983 to Page to use the LSF as an intermediate stage between the CPU and the disk. While the specific approaches are different, the final objectives and achievements are the basically the same:

speeding-up write operations of the disk subsystem in a computer without changing the host OS. The basic premise of these patents/published patent application is that the computer can find idle time to de-stage or move the data from the LSF disk or log disk to the disk that has the host OS layout. For example and referring specifically to U.S. Pat. No. 5,754,888; a smart algorithm is provided to find idle time and to de-stage data from the cache to the data disk. While presumably advancing the art, all of the described disk caching technologies; however, suffer from read performance penalty because of the lengthy process to locate and read data.

U.S. Pat. No. 6,243,795 to Yang et al proposes an asymmetric and redundant cache architecture that reduces the read performance penalty mentioned above and increases the reliability of the storage subsystem using redundant low cost disks. The objective of this invention is to provide a redundant and backup copy of cached data in a disk or disk array system using inexpensive disks. This architecture is not a complete mirror solution that mirrors data in its entirety, however; instead this architecture just backups the cached portion of data.

US Patent Publication No. 2002/0103983 to Page proposes an inexpensive solution that mirrors data in high speed disks using a large capacity and inexpensive disk. The objective is to replace the high speed mirror disk in a RAID-1 configuration using a large capacity and low cost disk that is partitioned into different zones. Some zones implement LSF data layout to allow quick writes and other zones use the same data layout as the disks being mirrored. This structure is similar to the logical cache disk in described in U.S. Pat. Nos. 5,754,888 and 6,243,795.

None of the inventions and technologies described in these patents/patent publications addresses the issue of real-time, asynchronous remote mirroring for data storage systems. US patent publication 2004/0117344 to Yang et al. describes a device driver algorithm that is inserted between the file system and the block device in a computer to allow write operations to be backed up in a remote computer. The invention and technology described in U.S. Pat. No. 5,754,888 also is used inside the device driver in an attempt to improve backup performance. Recent performance studies, however, has tended to show that the caching function described in U.S. Pat. No. 5,754,888 has severe performance limitations. Thus, it appears users will experience significant delays if remote mirroring is to be performed even using the cache technology mentioned above.

Because of performance impact and high cost of block level, real-time, asynchronous remote mirroring, many companies have been providing low cost backup solutions for companies that have limited bandwidth budget, or less demanding replication requirements. These solutions/services, however, are generally based on file system level data backup at predetermined time intervals such as weekly, daily, or hourly. With these solutions/services, a specialized backup application program is invoked or executed at the designated backup time point to collect file changes and to also transfer the changes to a remote site.

For example, products offered by one company (i.e., Connected) use their proprietary program that starts, at the scheduled backup time, runs by examining metadata to find changes made since the last backup, and creates a delta file. This delta file is then transmitted to the server program through a TCP/IP socket and the server program in turn then updates the changes in the backup file. There are variety of variations and improvements of file-based backup solutions including reducing the size of the delta file, using byte-patching that sends only the changed bytes and so on. Although these solutions/technologies have better efficiency and network performance than blindly backing up entire files, the data is vulnerable between scheduled backup times and also because it takes several minutes or longer to do the backups.

In sum, the main challenge facing the storage vendors, particularly vendors whose products are for small to medium size businesses, is providing high performance and full featured storage systems with low cost. As such, it is not appropriate in these cases to use tens of Gigabytes of battery backed RAM as a cache to implement asynchronous remote mirroring. As a practical matter, this is why iSCSI vendors do not have remote mirroring functions in their product offerings [e.g., see Storage Magazine, January 2004]. The approaches of most low-end to medium storage vendors are to offer snapshot and backup solutions for disaster recovery.

It thus would be desirable to provide a new device, system and methods for providing data storage replication, mirroring and/or back-up for low-end to midsize storages that can provide asynchronous, remote mirroring without affecting application performance as is experienced by conventional low-end to medium storage products. It would be particularly desirable to provide such devices, systems and methods that also would provided a mechanism by which such data replication, mirroring and/or back-up can occur essentially in real time. It also would be particularly desirable to provide such devices and systems that use a caching technique that is less expensive than conventional devices and systems that use an all NVRAM cache.

SUMMARY OF THE INVENTION

The present invention features storage devices, systems and methods for providing data storage replication, mirroring and/or back-up. Such data storage systems include one or more data storage devices of the present invention, each of which are operably coupled to one or more workstations or computers or other digital processing device known to those skilled in the art via any one of a number of communication networks including but not limited to a LAN or a SAN. Such a data storage device is configured and arranged so that the data transmissions are seamless with respect to the user transmitting the data from the workstation/computer/other digital processing device.

Such data storage systems further include a second data storage device that is operably coupled to the first data storage device via any one of a number of communications networks known to those skilled in the art, such as a WAN. In more particular embodiments, the second data storage device is located remote from the location of the first data storage device so that a catastrophe affecting the functionality or availability of the first data storage device (e.g., physical destruction of first data storage device) should not or is not likely to affect the second data storage device and/or at a location remote from the first data storage device as established by any applicable distance spacing requirements that may be imposed or set.

The first data storage device is further configured and arranged so that data being stored for transmission to the second data storage devices is saved using Log-Structured File system (LSF) features. In more particular embodiments, the first data storage device includes a cache or memory (e.g., battery backed RAM, NVRAM) and a sequentially accessed persistent storage (SAPS) device such as a disk with sequential data layout that is operably coupled thereto. The cache or memory receives the writes from the workstations and buffers these writes in the memory to form large logs of data that is to be subsequently and sequentially written into the SAPS device.

In further embodiments, a watermark or criterion is established that controls when the entire log in the memory is to be written sequentially to the SAPS device. In this embodiment, when the log size reaches the watermark, the entire log is written sequentially to the SAPS device/disk in one seek operation. When the log is sequentially written into the SAPS device, the data is not dispersed about the SAPS device as that occurs with conventional disk devices (e.g., see FIG. 1), thereby decreasing seeking and accessing time. In more particular embodiments, the watermark is dynamically determined based on write operation frequency, burst size, available RAM space, and the status of the log disk, thereby making the first data storage system adaptive to the dynamic behavior of the storage system.

In further embodiments, the second data storage device is configured and arranged so that the data transmissions from the first data storage device also are stored or saved in the second data storage device in storage embodying or using LSF features. In more particular embodiments, the first data storage device includes a cache or memory (e.g., battery backed RAM, NVRAM) and a log disk that is operably coupled thereto. The memory receives the writes from the workstations and buffers these writes in the memory to form large logs of data that is subsequently and sequentially written into the log disk.

In further embodiments, the second data storage device further includes a persistent storage device such as, but not limited to a hard magnetic disk. Also, the second data storage device is configured and arranged so at specified times the data that is stored in the SAPS device of the second data storage device is read out, reassembled in the appropriate format for storage in the persistent storage device and then written to the persistent storage device. In this way, the data contained in a persistent storage device of the first data storage device is mirrored or replicated in the persistent storage device of the second data storage device.

In further embodiments, the data in the SAPS device/disk of the first data storage device is read out sequentially in log format to form batches for transmission to the second data storage device for purposes of remote mirroring. In particular embodiments, the time intervals between two mirroring operations and/or the batch sizes are dynamically determined based on network traffic, write frequency, burst size, and disk status.

In further embodiments, the data storage back-up systems of the present invention are configurable so as to include a plurality or more of connections so that the first data storage device is operably coupled to a plurality or more computer servers, thereby allowing parallel communication (reads/writes) to take place there between. In more particular embodiments, the connections between the first data storage device and the plurality or more computer servers embody any of a number of communication protocols known to those skilled in the art, now or hereinafter developed, including but not limited to TCP/IP, FC (Fibre channel), or iSCSI.

It also is contemplated and thus within the scope of present invention that the data storage back-up systems of the present invention be configured and arranged so: N first data storage devices (N≧2) are operably coupled to a second data storage device; so a first storage device is operably coupled to M second storage devices (M≧2); so N first data storage devices (N≧2) are operably coupled to M second storage devices (M≧2), where N≠M; and so N first data storage devices (N≧1) are operably coupled to M second storage devices (M≧1), where N=M.

In further embodiments, a plurality or more of connections comprising the communication links are established between the first and second data storage devices of a data storage back-up system of the present invention so as to allow parallel packet transfers between such devices. In more particular embodiments, such connections embody any of a number of communication protocols known to those skilled in the art, now or hereinafter developed, including but not limited to TCP/IP, FC (Fibre channel), or iSCSI.

In yet further embodiments, packets arriving at the either or both of the first and second data storage devices can be out of order in which they were originally transmitted to the first or second data storage device. As such, the first and data storage devices are further configured and arranged (e.g., configured so as to embody an algorithm) so the specific data storage device can process the arriving packets out of order but to commit them in order to ensure correctness. This has the advantageous affect of increasing processing performance greatly as there is no need to transfer and store the packets in order in the SAPS device.

The data storage back-up systems and data storage devices of the present invention advantageously provide an efficient and reliable means for remote mirroring to protect data from various kinds of failures. Further, such data storage back-up systems and data storage devices advantageously provide a mechanism by which data can be replicated at real time or near real time speeds and thus capable of attaining a performance similar to that seen for other systems embodying dedicated communication links but at a significantly less cost as compared to such other systems. Also, the capability of data storage back-up systems and the first and second data storage devices of the present invention to dynamically adapt and/or adjust their operation advantageously improves dramatically the performance and reliability of a networked storage system as compared to conventional systems including those embodying iSCSI communication protocols.

Other aspects and embodiments of the invention are discussed below.

Definitions

The instant invention is most clearly understood with reference to the following definitions:

A computer readable medium shall be understood to mean any article of manufacture that contains data that can be read by a computer or a carrier wave signal carrying data that can be read by a computer. Such computer readable media includes but is not limited to magnetic media, such as a floppy disk, a flexible disk, a hard disk, reel-to-reel tape, cartridge tape, cassette tape or cards; optical media such as CD-ROM and writeable compact disc; magneto-optical media in disc, tape or card form; paper media, such as punched cards and paper tape; or on carrier wave signal received through a network, wireless network or modem, including radio-frequency signals and infrared signals.

Dirty data shall be understood to mean data or a block of data that is resident in a non-disk storage media (e.g., NVRAM cache) but not yet copied to/stored in a disk type storage medium (e.g., hard disk).

Clean data or a clean block of data shall be understood to mean data or a block of data that is resident in a non-disk storage media (e.g., NVRAM cache) but which has been successfully copied to a disk type storage medium (e.g., hard disk).

LAN shall be understood to mean and include any of a number of Local Area Network(s) as is known to those skilled in the art.

SAN shall be understood to mean and include any of a number of Storage Area Network(s) as is known to those skilled in the art.

WAN shall be understood to mean and include any of a number of Wide Area Network(s) known to those skilled in the arts.

DVRAM shall be understood to mean and include any of a number of dynamic random access memories and/or memory chips known to those skilled in the art.

NVRAM shall be understood to mean and include any of a number of non-volatile random access memories or memory chips known to those skilled in the art.

SRAM shall be understood to mean and include any of a number of static random access memories or memory chips known to those skilled in the art.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIG. 1 is an illustrative of a conventional system illustrating how data can be stored in a hard disk driver type of storage medium;

FIGS. 6A-C are illustrative views of various data structures embodied in the present invention, including the virtual device cache (FIG. 6A), a log buffer (FIG. 6B) and a log buffer group (FIG. 6C);

FIG. 7A-I are flow diagrams of various processes/functions executed within the processors of the storage apparatuses of the present invention;

DESCRIPTION OF THE PREFERRED EMBODIMENT

Figure 2A:
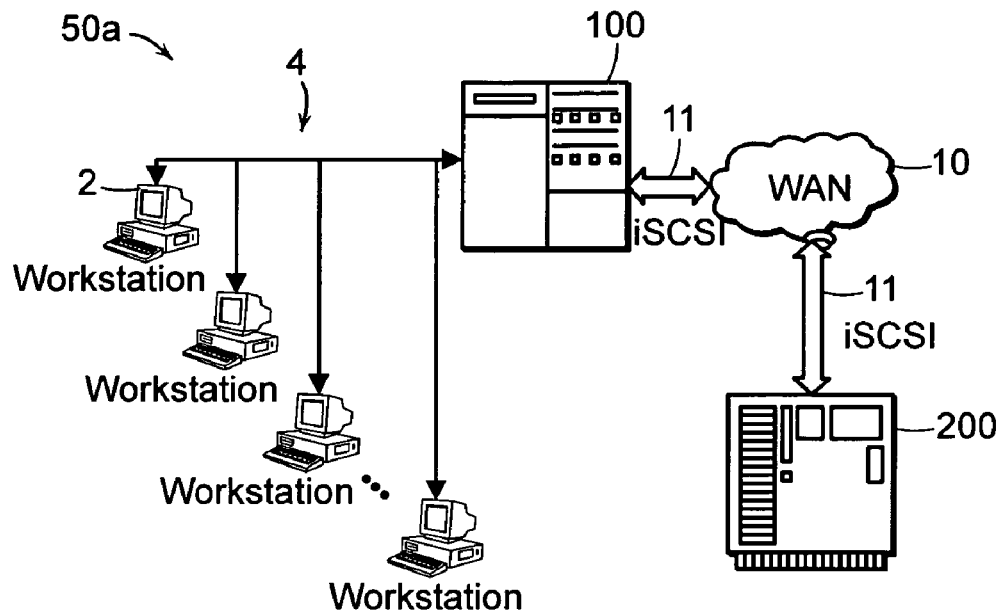
FIGS. 2A-C are block diagram views illustrating various embodiments of storage system according to the present invention.
Figure 2B:
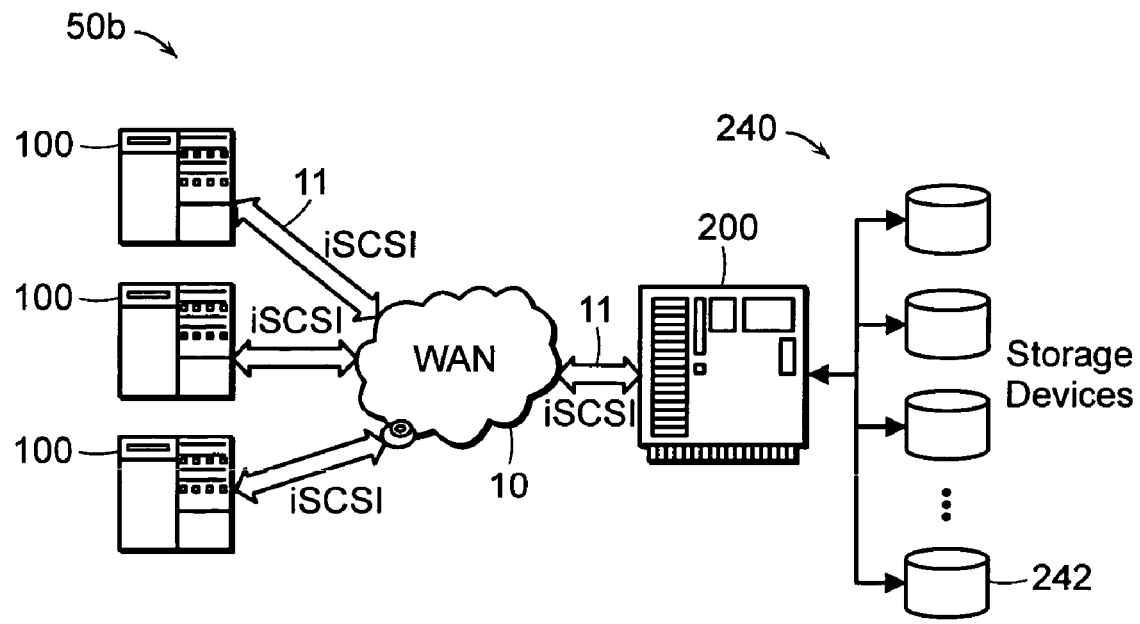
Figure 2C:
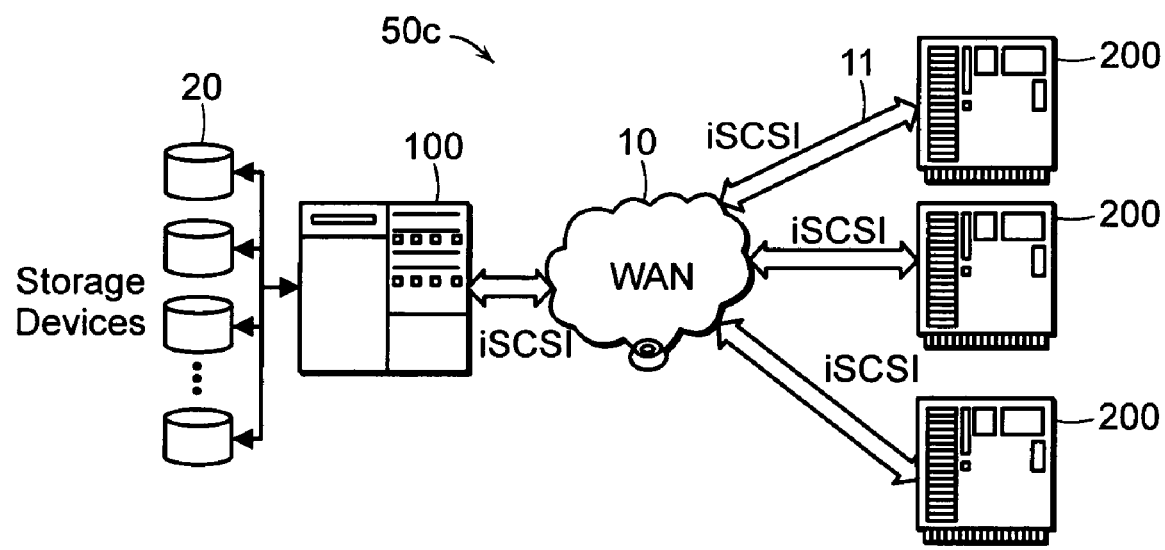

Referring now to the various figures of the drawing wherein like reference characters refer to like parts, there are shown in FIGS. 2A-C various arrangements for a data storage back-up system 50 according to the present invention that is adaptable for use in replicating, mirroring and/or backing-up data or information. In this regard, it should be noted that reference numeral 50 is used when generally referring to the data storage back-up system of the present invention, however, when referring to specific versions/aspects or embodiments of the present invention, the number 50 is followed by a letter (e.g., a) and thus; the reference numeral is an alphanumeric character as it appears on the above-identified figures.

Referring now to FIG. 2A, there is shown a data storage back-up system 50a including first and second data storage devices 100, 200 according to the present invention, which are described further hereinafter. As illustrated, the first data storage device 100 is operably coupled via a network 4 (e.g., LAN) to a plurality or more of workstations 2, computers or other digital processing devices so that data or I/O requests (i.e., reads or writes) from a user are communicated to and processed within the first data storage device. If the I/O or data request is a read operation, then as herein described the first data storage device 100 returns the requested data/information to the workstation 2 of the user making the request via the network 4. If the I/O operation is a write operation, then as herein described the transmitted data is written into the first data storage device 100 and the appropriate message is returned to the user's workstation to acknowledge a successful write operation.

The first and second data storage devices 100, 200 are operable coupled to each other via another network 10 (e.g., WAN or SAN) and in more particular embodiments, the communication links between the first and second data storage devices 100, 200 embody any of a number of network protocols known to those skilled in the art, such as iSCSI, TCP/IP, FC and the like. As herein described, the temporary data set(s) being stored in the first data storage device 100 is transmitted to the second data storage device 200, for replication or mirroring of the data being stored within the first storage device. The reading and transmission of the data from the first storage device 100 and the subsequent writing of this data in the second data storage device 200 is described further herein. In more specific embodiments, the first and second data storage devices 100, 200 of the present invention further include an initiator and a target device such as for example, an iSCSI initiator and an iSCSI target device.

Referring now to FIG. 2B there is shown another data storage back-up system 50b that includes first and second data storage devices 100, 200 according to the present invention, which are described further hereinafter, where the workstations operably coupled to the first data storage device 100 have not been shown for clarity. In this embodiment, the data storage back-up system 50b includes a plurality or more of first storage devices 100 and a second data storage device 200 that is operably coupled to each of the plurality or more first data storage devices. In the illustrated embodiment, there are three first data storage devices 100; however, this shall not be construed as particularly limiting the data storage back-up system 50b as it is within the skill of those knowledgeable in the art to configure the system to include N first data storage devices of the present invention, where $N \geq 2$ for this embodiment.

Each of the plurality or more of first data storage devices and the second data storage device 200 are operable coupled to each other via another network 10 (e.g., WAN or SAN) and in more particular embodiments, the communication links between the first and second data storage devices 100, 200 embody any of a number of network techniques/protocols as is known to those skilled in the art, such as iSCSI, TCP/IP, FC and the like. As herein described, the temporary data set(s) being stored in any of the first data storage devices 100 is transmitted to the second data storage device 200, for replication or mirroring of the data being stored within that first storage device. The reading and transmission of the data from the first storage device and the subsequent writing of this data in the second data storage device is generally described further herein. It is well within the skill of those knowledgeable in the arts to configure the first and second data storage devices 100, 200 so as to control the communications between multiple devices.

Referring now to FIG. 2C, there is shown another data storage back-up system 50c including first and second data storage devices 100, 200 according to the present invention, which are described further hereinafter, where the data storage devices 20 of workstations 2 operably coupled to the first data storage device 100 are shown as being operably coupled to the first data storage device. In this embodiment, the data storage back-up system 50c includes a first storage device 100 and a plurality or more of, more specifically M second data storage devices 200 that are each operably coupled to the first data storage device, where $M \geq 2$ for this embodiment.

Each of the plurality or more of second data storage devices 200 and the first data storage device 100 are operable coupled to each other via another network 10 (e.g., WAN or SAN) and in more particular embodiments, the communication links between the first and second data storage devices 100, 200 embody any of a number of network techniques/protocols as is known to those skilled in the art, such as iSCSI, TCP/IP, FC and the like. As herein described, the temporary data set(s) being stored in the first data storage device 100 is transmitted to one or more of the second data storage devices 200, for replication or mirroring of the data being stored within that first storage device. The reading and transmission of the data from the first storage device 100 and the subsequent writing of this data in the one or more second data storage devices 200 is generally described further herein. It is well within the skill of those knowledgeable in the arts to configure the first and second data storage devices 100, 200 so as to control the communications between multiple devices.

It is contemplated and thus within the scope of present invention that a data storage back-up system 50 of the present invention be configured and arranged: so that N first data storage devices 100 (where $N \geq 2$) are operably coupled to a second data storage device 200; so that a first storage device 100 is operably coupled to M second storage devices 200 (where $M \geq 2$); so that N first data storage devices 100 are operably coupled to M second storage devices 200 (where $N \geq 2$, $M \geq 2$ and where $N \neq M$); and so that N first data storage devices 100 are operably coupled to M second storage devices 100 (where $N \geq 1$, $M \geq 1$ and where $N=M$).

Figure 3:
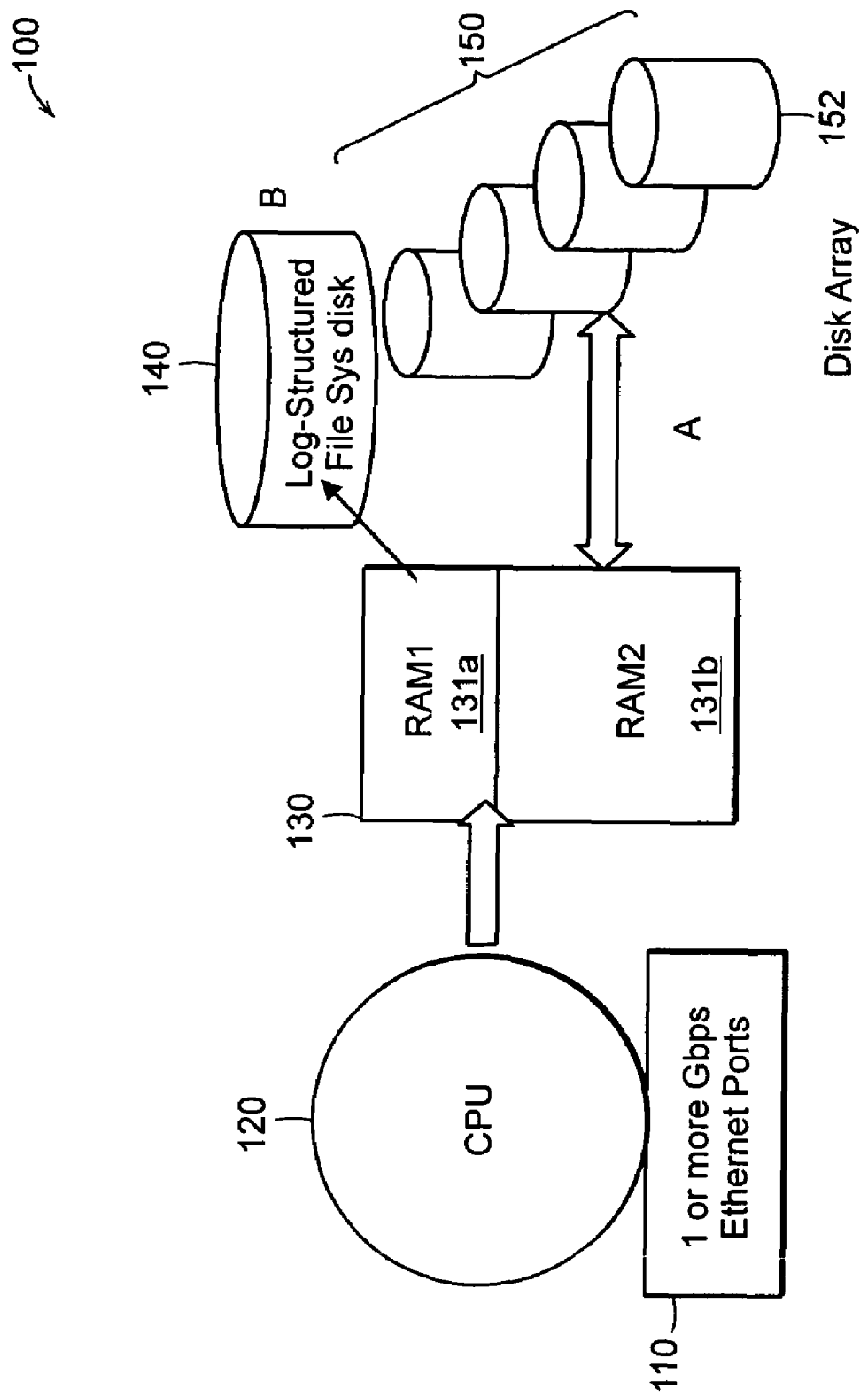
FIG. 3 is a block diagram view illustrating the internal structure of a storage apparatus of the present invention.

Referring now to FIG. 3, a first data storage device 100 according to the present invention includes one (1) or more network ports 110, such as Ethernet/FC ports that are each operably coupled to a microprocessor or CPU 120, a memory 130 that is operably coupled to the CPU and two storage devices 140, 150 that are operable coupled to the memory. The first data storage device 100 provides block level data storage to application servers over an Ethernet LAN or FC SAN so that a host computer sees it as a local hard drive or virtual storage.

Such a first data storage device 100 also can include I/O devices (not shown) as are know to those skilled in the art, such as a keyboard and mouse, and a display device (not shown) as is known to those skilled in the art such as CRT and LCD type of display devices that are operably coupled to the CPU. The CPU 120, network port(s) 110 and memory 130 are selected from any of a number of CPUs, network and memory devices, boards and/or chips known to those skilled in that art as well as any hereinafter developed. In exemplary embodiments, the memory 130 comprises RAM, DRAM, SRAM, NVRAM or other such random access memories known or hereinafter developed and adaptable for use in the present invention. Also, in the case where the memory 130 is of the volatile type, in yet further exemplary embodiments, such memory is battery backed.

In particular embodiments, the first data storage device 100 is an iSCSI target storage system with 2 to 4 standard gigabit Ethernet interfaces or ports used to connect to any application server that has an iSCSI initiator (e.g., software initiator or hardware iSCSI HBA). An application server with an iSCSI initiator, whether a software initiator or a hardware iSCSI HBA, will immediately see the added capacity of the prime storage at block level for the first data storage device 100 similar to a local hard disk. Also, with the present invention, adding storage to a system is as simple as plug-and-play by just hooking up the RJ-45 connectors to the storage device 100 and the Ethernet switch that connects application servers. In this way when storage requirements grow, storage can be added as and when needed and expanded easily thereby eliminating the need to allocate resources up front for large storage capacity.

In use, when a write operation is to be performed within the first data storage device, the data is written to both of the storage devices 140, 150 as further described herein. As such and in more particular embodiments, the memory 130 is functionally partitioned so as to form discrete memories or memory partitions 131 a,b, where one partition 131b is used for buffering or caching the data that is to be stored in a persistent storage device 150 for permanent or long term storage. The other partition 131a is used for buffering the logs containing the transmitted data that are to be sequential written at some time to a sequentially accessed persistent storage (SAPS) device 140. In more particular embodiments, such partitioning is implemented using NVRAM or battery backed DRAM/SRAM. Alternatively, the processing system of the first storage device can embody multiprocessor techniques and/or a plurality of discrete memory devices that can be individually accessed by the CPU 120 or by the multiprocessors.

In exemplary embodiments, the SAPS device is a disk device such as a magnetic hard disk that is formatted or arranged so as to have a sequential data layout such as that used in a Log-Structured File system (LSF). The particular storage device(s) is any of a number of storage devices known those skilled in the art, as well as those hereinafter developed, having the characteristics and capabilities herein described. In illustrative embodiments, such storage devices include magnetic hard disk drives/devices and magneto-optical storage drives/devices.

In more particular embodiments, the SAPS device/disk 140 and the persistent storage device/disk 150 are configurable so as to be comprised of an array of disk devices. In particular embodiments, such an array of disk for the persistent storage device 150 includes an array that comes with 4-bay, 6-bay, 8-bay, 12-bay and 16-bay etc. configurations with maximum capacity of terabytes of data storage. Further, such the disks can form an array of disks that can be configured for various RAID levels for high performance and high reliability including but not limited to RAID0, RAID1, RAID5, RAID10, and RAID50. As is known to those skilled in the art, with RAID 1, 5, 50, or 10, an array of disks can tolerate any single disk failure.

In yet further embodiments, the SAPS device/disk 140 can comprise or be in the form of a partition provided in the persistent storage device 150. In this case, the SAPS device/disk 140 would physically reside in the persistent storage device 150. In such a case, however, the data layout and structure of this partition would follow the same structure as if it was a separate physical storage, a Log-Structured File system format and not the data layout and structure of the other partitions in the persistent storage device 150.

In yet further embodiments, the first data storage device 100 is configured and arranged so as to provide built-in redundancy at various levels and components. In more particular embodiments, the supply, cooling fan, controller board, and cache all support optional redundancy. Also, the first data storage device is configurable so specific hardware components thereof are hot swappable thereby making it easy to replace a faulty component without bringing down the first data storage device 100 and thus the data storage back-up system 50 of the present invention; thereby ensuring continuity of operation. In further embodiments, the persistent storage device 150 can embody any of a number of other storage techniques and devices as is known to those skilled in the art such as that described for example, in U.S. Pat. Nos. 6,243,795, 5,645,999, and 6,516, 380 and US Patent Publication Nos. 2004/00117344 and 2002/0103983, the teachings of which are incorporated herein by reference.

The second data storage device 200 is configurable so as to have the same structure as that of the first data storage device 100. Thus, reference shall be made to the foregoing discussion regarding the first data storage device. In alternative embodiments and as illustrated in FIG. 5B, the second data storage device can be configured so that the memory 130 is not partitioned.

The operation and use of the data storage back-up system 50 of the present invention as well as the methodology of the present invention can be best understood from the following discussion and with reference to the flow diagrams of FIGS. 4A-D. Reference also should be made to FIGS. 2-3 for further details of the data storage back-up system 50, as well as the first and second data storage devices 100, 200 thereof. As seen from the following discussion, the present invention utilizes a software twin and a hardware twin as proposed solutions for mirroring data. While a data storage back-up system 50 according to the present invention preferably uses both the software and hardware to establish a remote mirroring capability it also is contemplated that the first data storage device is configurable so as to further include the capability to mirror data locally. As also can be seen from the following discussion, a data storage back-up system 50 according to the present invention includes cache and a parallel processing engine that allows synchronous/asynchronous remote mirroring to be done effectively and automatically over the Internet using iSCSI, ECIP OR iFC protocols.

The flow charts herein illustrate the structure or the logic of the present invention as embodied in computer program software for execution on a computer, digital processor or microprocessor. Those skilled in the art will appreciate that the flow charts illustrate the structures of the computer program code elements, including logic circuits on an integrated circuit, that function according to the present invention. As such, the present invention is practiced in its essential embodiment(s) by a machine component that renders the program code elements in a form that instructs a digital processing apparatus (e.g., computer) to perform a sequence of function step(s) corresponding to those shown in the flow diagrams.

As indicated herein, the first data storage device 100 of the present invention is configured and arranged so that a user can write data to the storage device and also to read data that is stored therein. As such, the process begins with a user command, Step 300, namely a command to initiate an I/O operation. After receiving the command the program being executed on the CPU 120 of the first data storage device 100 and embodying the methodology of the present invention determines if the I/O operation is a read or write operation, Step 302.

If it is a read operation (Step 302, Read), then the program being executed on the CPU 120 in turn causes an I/O operation to be initiated by the first data storage device to read/retrieve the data being sought from the permanent or long term storage device/disk array 150, Step 304. The specifics of retrieval of the data (e.g., head seeking) are well known in the art and thus are not repeated herein. Following retrieval of the data, the first storage device 100 would encode or otherwise take the necessary and appropriate steps so that the data is communicated over the network 4 back to the workstation 2 and thus to the user/requestor that had initiated the I/O operation/command, Step 306.

If it is determined to be a write operation (Step 302, Write) then the program being executed on the first data storage device 100 receives the data transmitted from a workstation 2, Step 310. Thereafter, the program is executed so as to cause two write operations to be performed essentially simultaneously. In one write operation, the program initiates a conventional or standard write operation to the permanent or long term storage device 150, Step 312. The write operation can be acknowledged back to the workstation in any of a number of ways known to those skilled in the art including but not limited to; after the operation is done in the cache 131b for fast response time or after the write operation is done at the persistent storage device 150 for synchronous write.

Figure 6B:
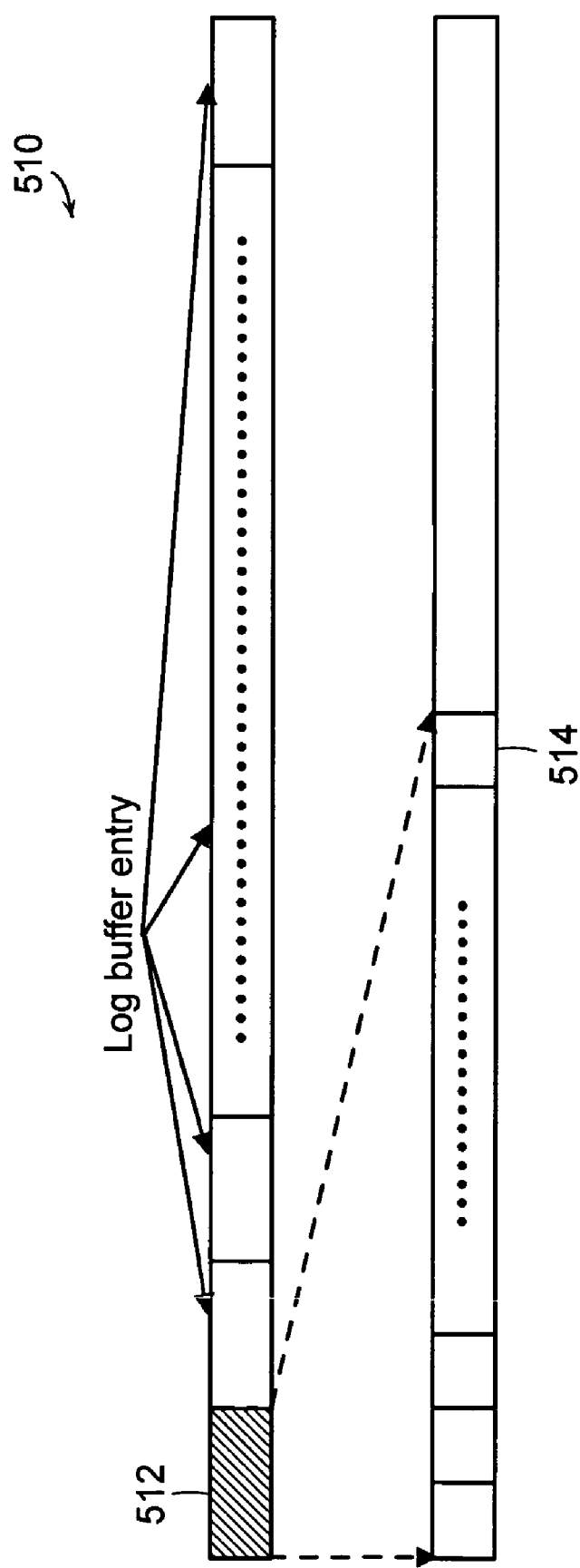

In the second write operation, the data is processed using Log-Structured File system (LSF) techniques so as to create one or more logs containing all of the transmitted data, Step 314. There is shown in FIG. 6B, exemplary arrangements for an exemplary illustrative log 510. In further embodiments, the log 510 includes one or more buffer headers and in more particular embodiments, the log 510 includes two headers that provide an indication of write status. The logs being created are cached or buffered in the memory 130, more specifically the memory partition 131a, Step 316, such as the cache entries 500 illustrated in FIG. 6A.

In more particular embodiments, the first data storage device 100 is configured so as to embody a caching algorithm that implements write-logging, sequential/stride pre-fetching for reads, intelligent replacement, and conflict-free hashing functions. Also, the cache organization optimizes the performance of applications that have spatial and temporal localities. Such applications include database applications, online transactions, email server applications, file server applications, web server applications, and more.

After transmitting the read data (Step 306), or after writing the data (312) or after caching or buffering the logs (Step 316) the process returns to process the next user command, Step 308. In further embodiments, the first storage device 100, more specifically the program being executed, is configured and arranged to execute one of the mirroring modes supported by the program that controls the degree of synchrony of the mirroring process. This can be done at the system level so that all data being mirrored is processed the same way, or is done so that each user can so specify the degree of synchrony of the mirroring process.

In the Synchronous-mirroring mode, the application process waits for two acknowledgements for a disk write operation, one from the persistent storage device/disk 150 of the first data storage device 100 and the persistent storage device/disk 150 of the second data storage device 200. In the case where the second data storage device 200 is a twin or duplicate of the first data storage device 100, every write operation received by the first data storage device 100 is immediately sent to the second data storage device. The first storage device 100 sends an acknowledgement to the application process when the write operations on both the first and second data storage devices 100, 200 are finished. This mirroring mode guarantees that data on the first and second data storage devices 100, 200 are synchronized for every change made on the data and data consistency is guaranteed all time. While this mirroring mode guarantees data safety for every write, it necessarily results in a slower completion of an I/O operation.

In the Asynchronous-mirroring mode, the application process (at the workstation 2) continues as soon as acknowledgement is received upon completion of a write to the first data storage device 100. In the case where the second data storage device 200 is a twin or duplicate of the first data storage device 100, the first data storage device also acknowledges the completion of the write operation back to the application process as soon as it is done therein. At the same time or at some later time as controlled by the first storage device 100, the first data storage device initiates a remote write operation to the second storage device 200 for replication. This mode allows one or a few outstanding write operations to the second data storage device 200 in flight while the application continues its process in the workstation. The exact number of outstanding write operations allowed is user configurable. If this number is one, the first data storage device 100 stalls for subsequent writes until the one in flight returns. This asynchronous mode has a performance benefit because it allows certain degree of parallel processing.

The Log-based write coalescing mode as herein described further improves mirroring performance and reduces network traffic. In the case where the second data storage device 200 is a twin or duplicate of the first data storage device 100, the first data storage device writes the received data into both its local or persistent storage device/disk 150 and to a log disk or the SAPS device/disk 140. The data in the log disk or the SAPS device/disk 140 are preferably to be mirrored to the second data storage device 200 in batches. In particular embodiments, the batch size is determined dynamically based on three system statuses: network condition, log size, and write frequency. This mode further improves mirroring performance and reduces network traffic. Particularly, if applications have many data overwrites, the log-based batch processing can significantly improve performance with some compromise of interval times when mirrored data are not consistent. From testing, such time intervals are believed to be on the order of a few seconds.

Figure 4A:
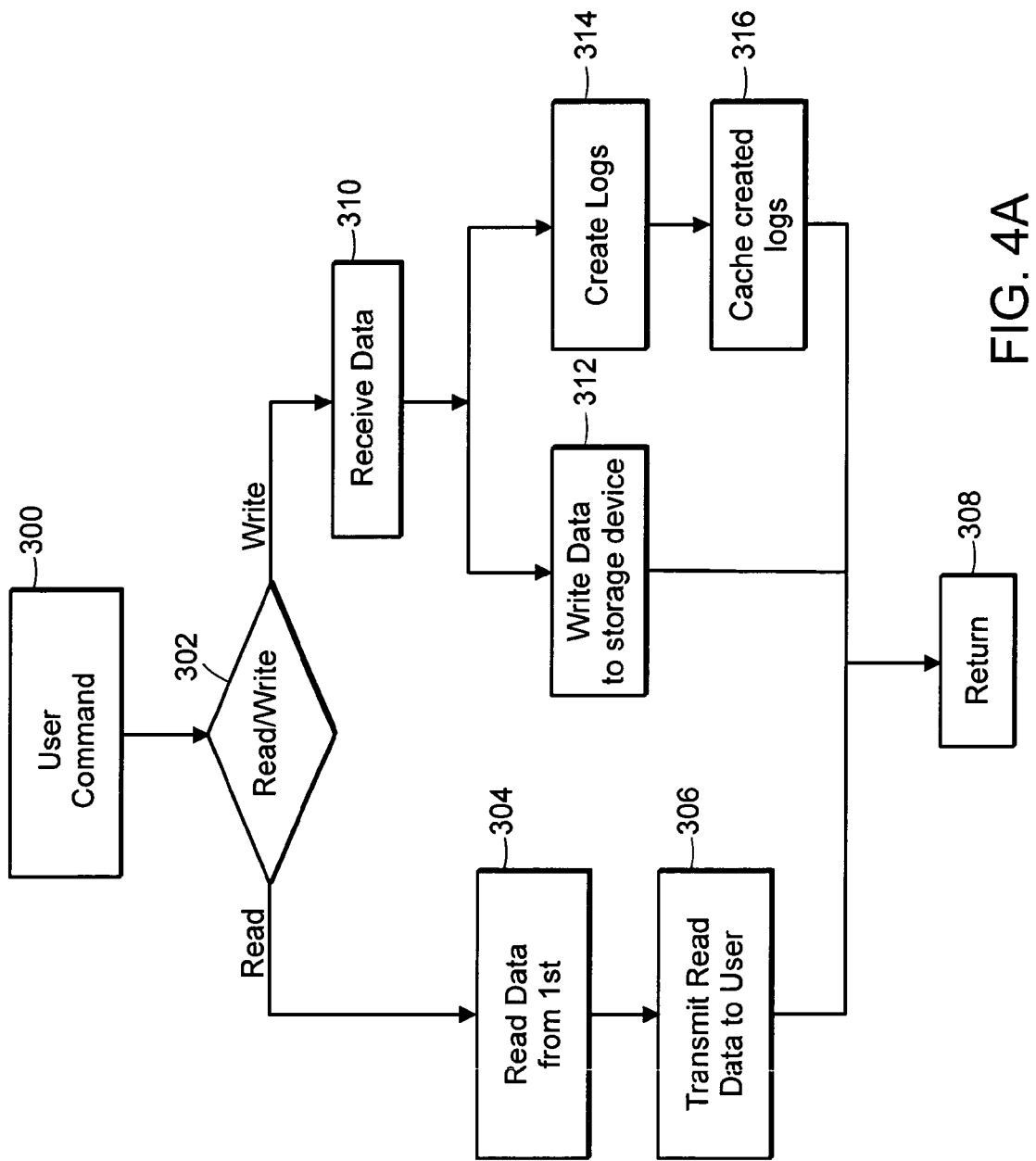
FIGS. 4A-D are high level flow diagrams illustrating the various processes performed by the first and second storage devices and the storage system of the present invention.
Figure 4B:
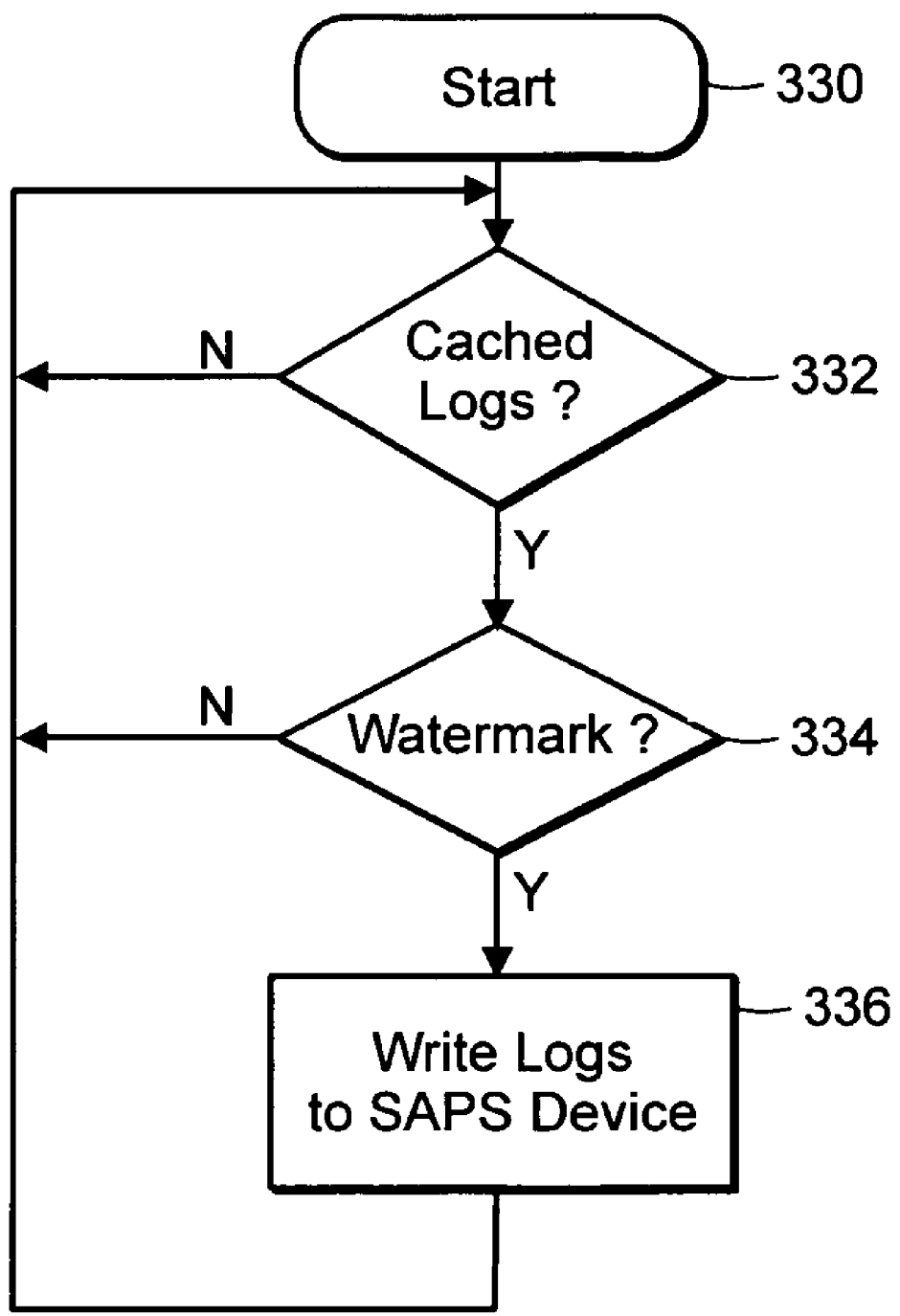

Now with reference also to FIG. 4B, there is shown a process for writing cached logs to the SAPS device/disk 140 of the first data storage device 100. In particular, after the data storage back-up system 50 is initially configured for operation, the first data storage device 100, more particularly the program being executed thereon, also is configured and arranged so as to start a process for writing the logs to the SAPS device 140, Step 330. The combination of the cache memory 130 and the SAPS device 140 yields an arrangement whereby a storage device having high-speed processing characteristics and sufficient capacity is available to initial cache the logs and a lower cost storage device is available to store the logs for later retrieval in accordance with the methodology of the present invention.

Following the starting of the process the program being executed determines if there are cached logs, step 332. If there are cached logs (Step 332, Yes) the program also determines if the watermark or pre-established criterion for initiating the log writing process has been reached/meet, Step 334. In more particular embodiments, the watermark or pre-established is dynamically determined based on write operation frequency, burst size, available RAM space, and the status of the log disk, thereby making the first data storage device 100 adaptive to the dynamic behavior of the storage system.

If the watermark or pre-established criterion for initiating the log writing process has been reached/meet (Step 334, Yes), then first data storage device 100, more particularly the program(s) being executed therein, is configured and arranged so as to cause the log(s) to be written to the SAPS device/disk 140. More particularly, when the log size reaches the watermark, the entire log is written sequentially to the SAPS device/disk in one seek operation. When the log is sequentially written into the SAPS device, the data is not dispersed about the SAPS device, which is what occurs with conventional disk devices, thereby decreasing seeking and accessing time as compared to conventional disk devices. If there are no cached logs (Step 332, No), or the watermark/pre-established criterion has not been reached/met (Step 334, No) or after the logs have been written to the SAPS device/disk 140 (STEP 336) the process returns to the beginning so as to repeat this process.

Figure 4C:
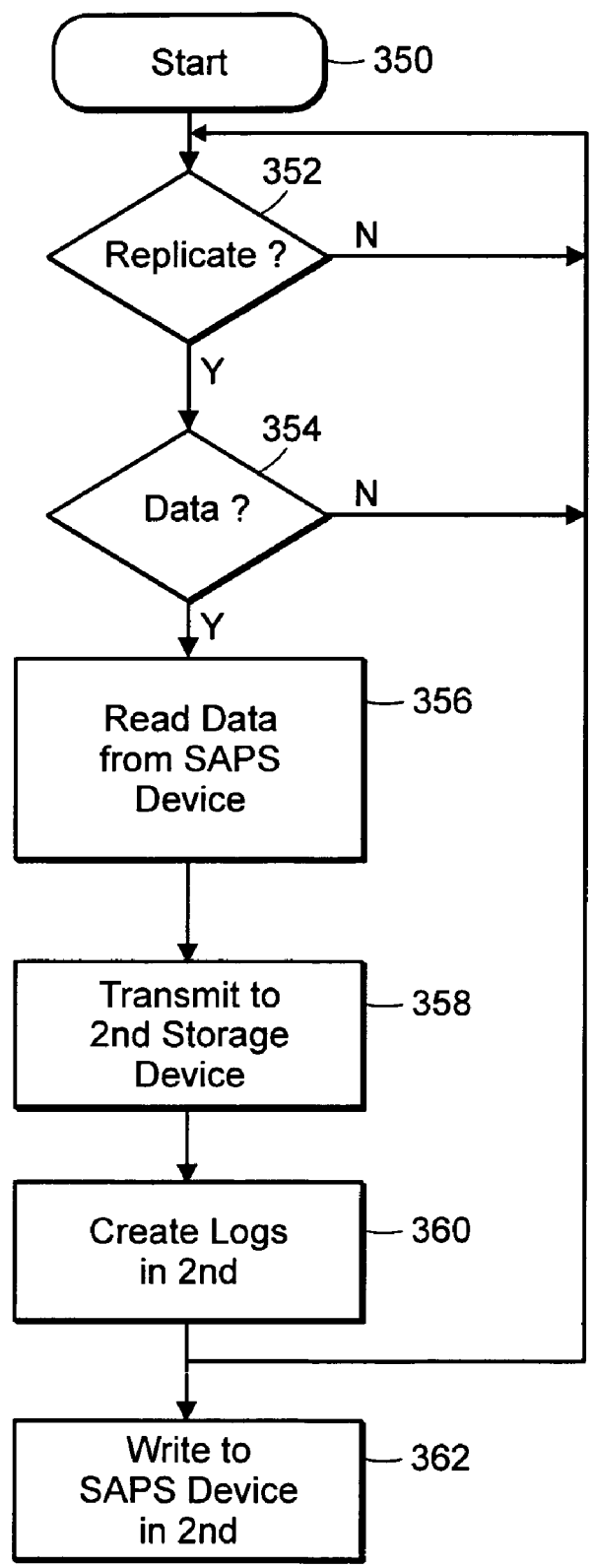

Referring now to FIG. 4C there is shown a process for communicating or transmitting the data contained in the SAPS device 140 of the first data storage device 100 to the second data storage device 200 for replication. After the data storage back-up system is initially configured for operation, the first data storage device 100, more particularly the program being executed thereon, also is configured and arranged so as to start a process for replicating or mirroring data to the second data storage device 200, Step 350.

After the process is started, the program continues to determine if it is time to replicate data, Step 352 and also if there is data to be replicated, Step 354. If it is time to replicate (Step 352 Yes) and there is data to replicate (Step 354, Yes), then the first data storage device or the program being executed thereon, is configured and arranged to read the data/logs from the SAPS device 140, to prepare the data/logs for transmission to the second data storage device 200, and to transmit the data/logs to the second data storage device, Steps 356, 358. Such preparation of the data for transmission can further include data compression and encrypting the data/logs for transmission using the appropriate communication protocols such as those referred to herein.

In further embodiments, the data in the SAPS device/disk 140 of the first data storage device 100 is read out sequentially in log format to form batches for transmission to the second data storage device 200 for purposes of remote mirroring or replicating. In particular embodiments, the time intervals between two mirroring operations and/or the batch sizes are dynamically determined based on network traffic, write frequency, burst size, and disk status.

After receiving the transmitted data/logs, the second data storage device 200 creates log entries and cache them in the memory 130 of the second storage device, Step 360. Such a caching of log entries is illustrated in FIG. 6A for example. In further embodiments, the second data storage device is configured to decompress/uncompress and/or decrypt the encrypted data transmission. Thereafter, logs are sequentially written to the SAPS device/disk 140 of the second data storage device, Step 362 in a similar fashion as that done to the SAPS device/disk 140 of the first data storage device 100. If it is determined that it is not time to replicate (Step 352, No) or that there is no data to replicate (Step 354, No) the first data storage device 100 returns to determining it is time to replicate and the like. In further embodiments, following creation of the logs in the second data storage device 200 the first data storage device 100 returns to determining it is time to replicate and the like.

Figure 4D:
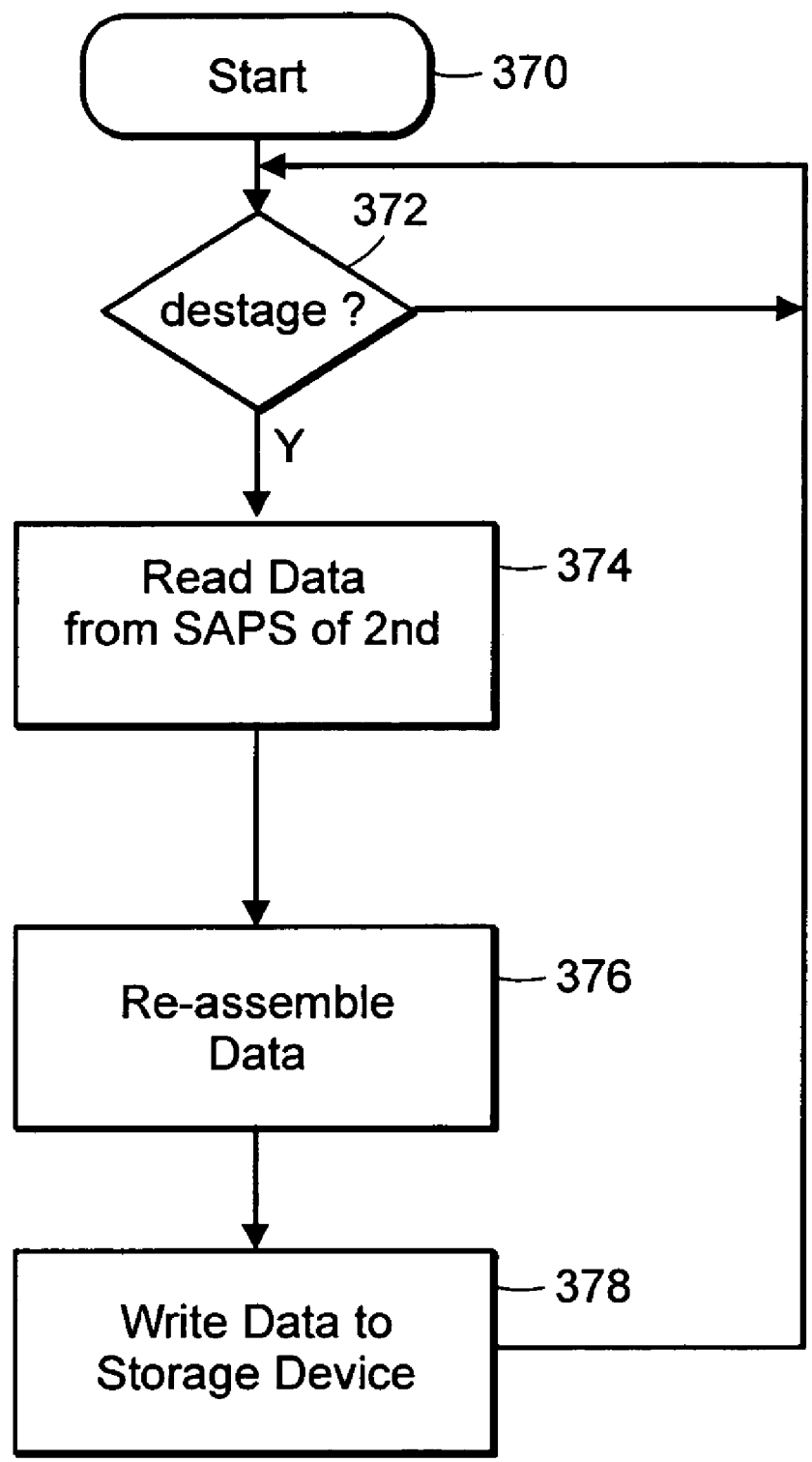

Referring now to FIG. 4D there is shown a process for de-staging the logs of data saved in SAPS device/disk 140 of the second data storage device 200. After the data storage back-up system 50 is initially configured for operation, the second data storage device 200, more particularly the program being executed thereon, also is configured and arranged so as to start a process for de-staging the logs of data and to save the de-staged data in the persistent storage device 150 of the second data storage device 200 thereby concluding the replication or mirroring of the data initially transmitted from the user's workstation, Step 370.

Figure 6C:
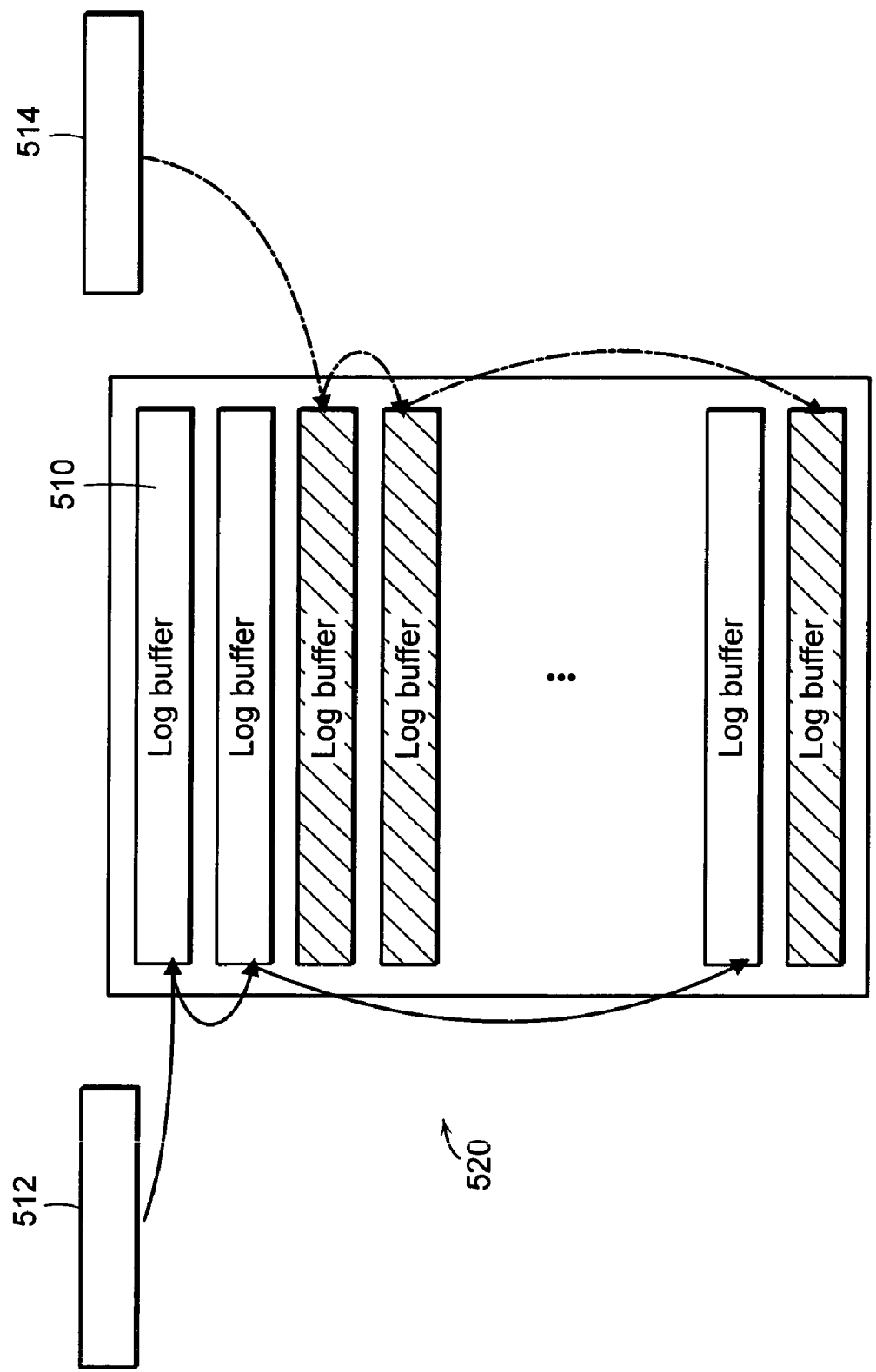

Thus, the second data storage device 200, more particularly the program being executed thereon is configured and arranged so as to determine if it is appropriate time to de-stage the data/logs in the second data storage device SAPS device/disk 140, Step 372. In particular embodiments, a determination is made to see if data is being transmitted to the second data storage device requiring use of the memory and/or SAPS device 140. During a quiescence period of communications, the second data storage device 200 reads the data/logs from the SAPS device/disk 140 and buffers the data in the memory much like that shown illustratively in FIG. 6C. Because data/logs can be generated with the data out of order from which it was received from the user's workstation, the data in the log buffers 510 is processed and recombined so the data is in the proper order prior to its commitment to storage in the persistent storage device/disk 150, Step 376.

As this writing process can be interrupted by the next received data transmission from the first data storage device, the log buffers include headers to include an indication of the writing status. Thus, a status indicator or header is provided to indicate when a buffer has been written to the persistent storage device/disk 150 (i.e., clean data) or is pending such writing (i.e., dirty data). As such, the second data storage device 200 or the program being executed thereon causes each of the headers to be appropriately annotated with such indications.

After re-assembling the data in the proper order for commitment and formatting it in the appropriate manner for storage in the persistent storage device/disk 150 of the second data storage device 200, the buffered data is written to the persistent storage device, step 378. Thereafter, the process returns to determining if it is appropriate to de-stage the next set of logs/data set in the SAPS device 140. In this way, the data contained in the persistent storage device 150 of the first data storage device 100 is mirrored or replicated in the persistent storage device 150 of the second data storage device 200.

In this regard, it should be noted that in more particular embodiments once data is initially mirrored or replicated in the second data storage device persistent storage device/disk 150, what is subsequently written to the persistent storage device are the changes to such data. The total amount of data changes for most businesses are found to be limited in size, particularly when compared to the size of the initially copied data, and are in most case nor more than 3 Gb per write.

As the first and second and data storage devices 100, 200 are operably coupled to each other via a network 10, in the case there is a failure or loss of the data contained in the persistent device/disk 150 of the fist data storage device 100, the data from the second data storage device 200 can be made readily available to the user for continued operation. In addition, when the failed first data storage device 100 is recovered, the back-up storage system 50 of the present invention is configured and arranged so as to automatically cause the data stored at the second data storage device 200 to be recovered (e.g., written) to the persistent storage device 150 of the recovered first data storage device via the network communication links. Similarly, if the second data storage device 200 undergoes a catastrophic failure, when the second data storage device is recovered the back-up storage system 50 of the present invention is configured and arranged so as to automatically cause the data stored at the first data storage device 100 to be recovered to the persistent storage device 150 of the recovered second data storage device 200 via the network communication links. It also is contemplated and thus within the scope of the present invention that other data transmission techniques as is known to those skilled in the art, such as a carrier or shipping physically using a magnetic or magneto-optical storage medium such as in the forms of tapes or disks be used to transmit data for recovery of a failed data storage device 100, 200; more particularly the persistent storage device for such a data storage device.

Figure 5A:
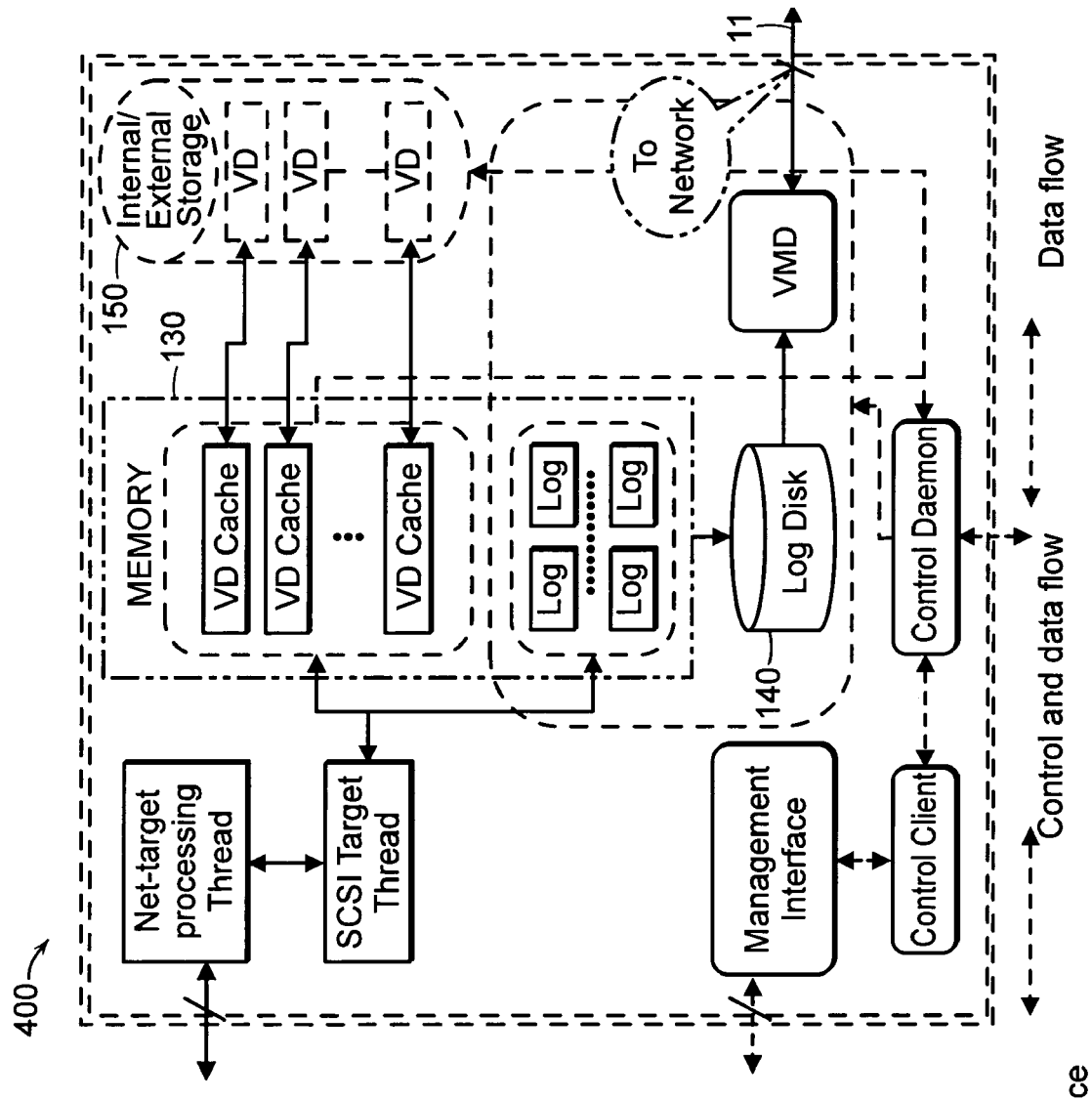
FIG. 5A is a block diagram view illustrating the architecture of the storage apparatus at one or more master sites.
Figure 5B:
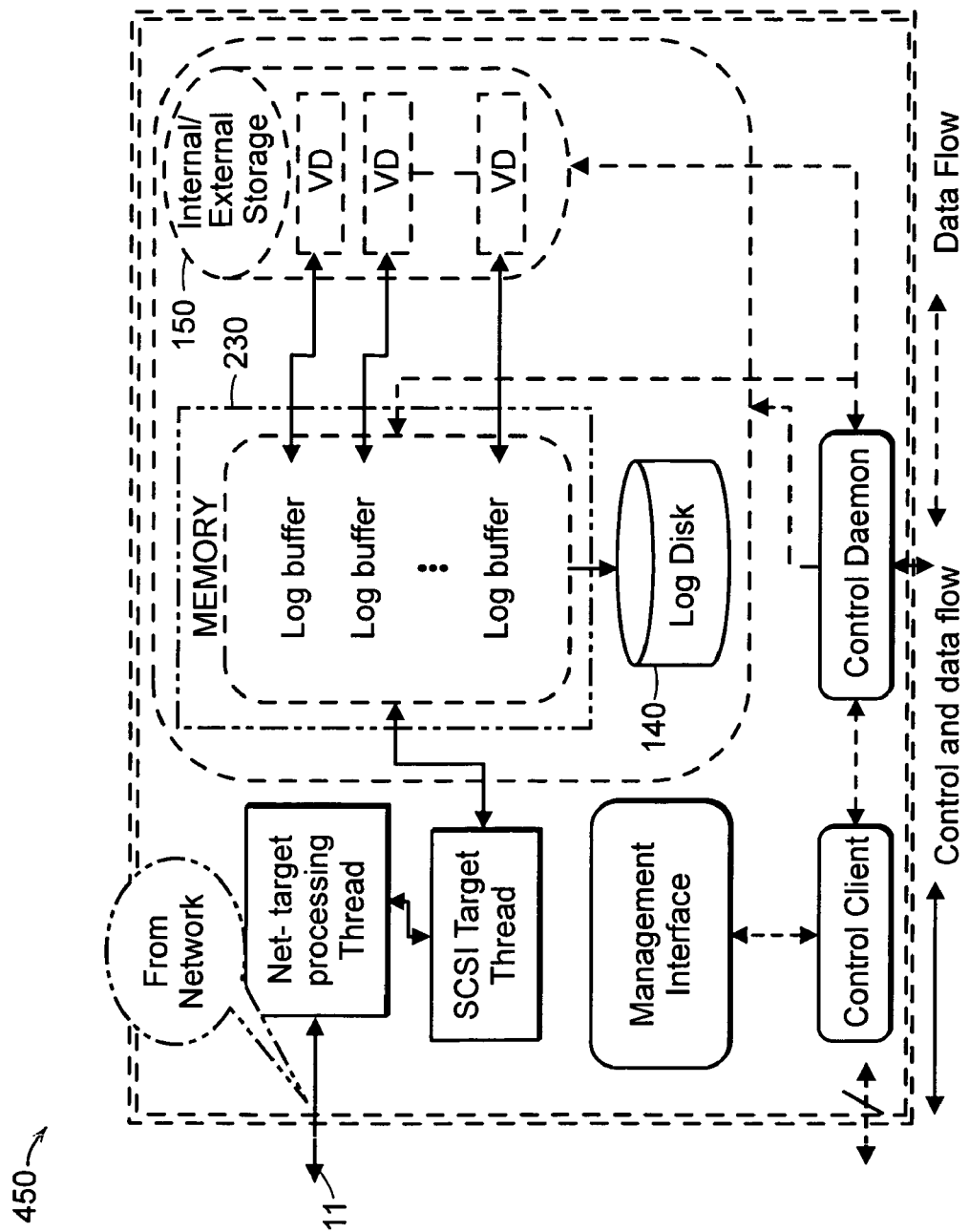
FIG. 5B is a block diagram view illustrating the architecture of the storage apparatus at one or more remote sites.

Referring now to FIGS. 5A,B there is shown a more particular embodiment of the architecture of the program(s)/software being executed on the first data storage device 100 and the architecture of the program(s)/software being executed on the second data storage device 200, respectively. Those functionalities or elements shown on the figures and not shown as being within the memory 130, the persistent storage device/disk 150 and the SAPS device/disk are executed within the processor or CPU 120 of the first data storage device 100 as is known to those skilled in the art. These figures should be referred to along with the flow diagrams provided as FIGS. 7A-I that illustrate more particular embodiments of the various processes/functions being executed in the first and second data storage devices 100, 200 of the present invention. Reference also should be made to the FIGS. 2-3 as to any details of the first and second data storage devices 100, 200 and the data storage back-up system 50 not otherwise shown nor described in the following.

Figure 7A:
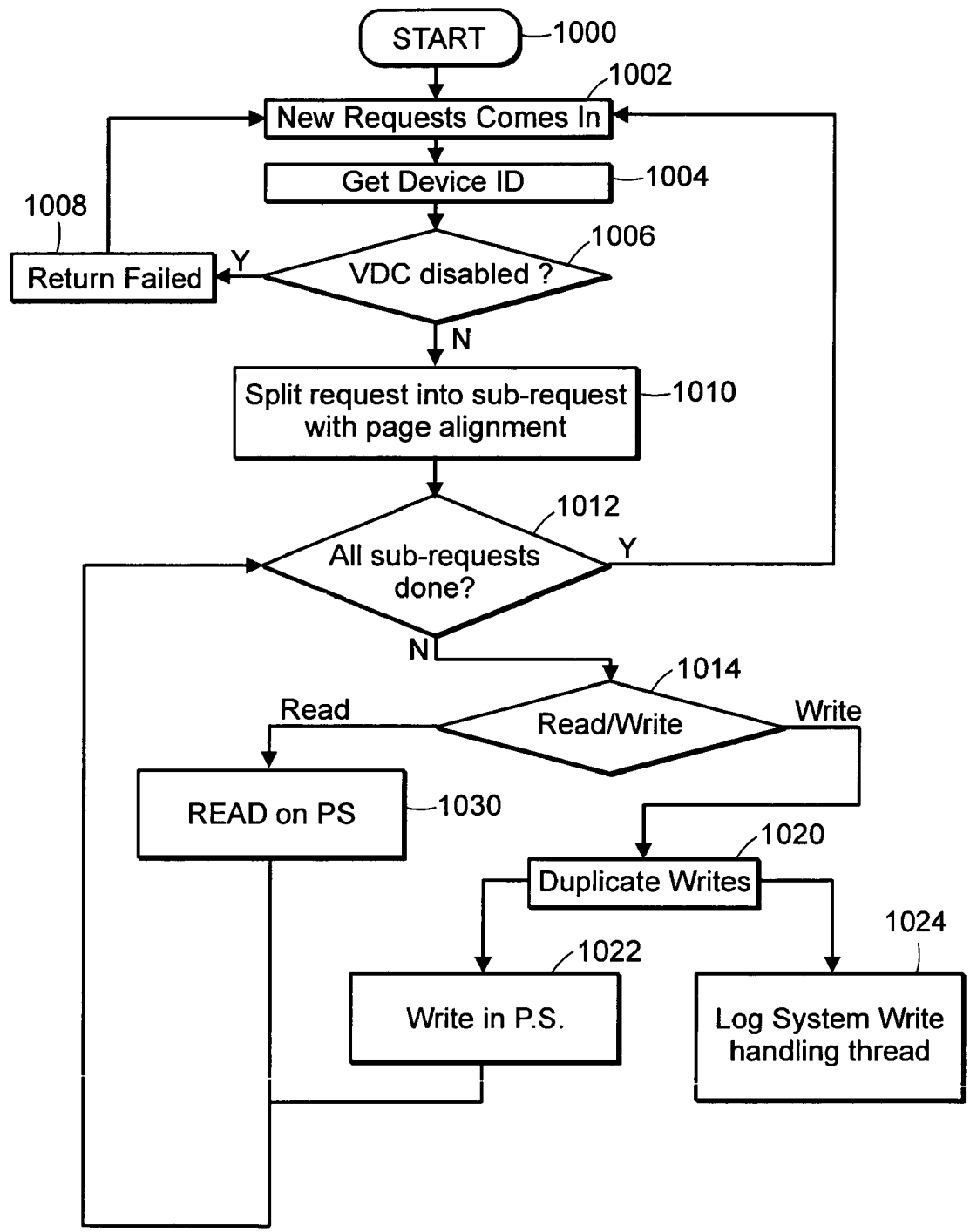

Referring now to FIG. 7A, there is shown a flow diagram illustrating the main process of the first data storage device 100 according to an embodiment of the present invention. After the data storage back-up system 50 is initially configured for operation, the first data storage device 100, more particularly the program being executed thereon, is configured and arranged so as to start the process for processing I/O request from a user's server or workstation 2, Step 1000. Thus, the first data storage device 100 continuously evaluates transmissions to it to determine if the received transmission(s) corresponds to a new I/O request, Step 1002. If it is a new I/O request, the first data storage device next gets the identifier of the device sending the request, Step 1004.

The first storage device 100 next determines if the VDC (Virtual Device Cache) is disabled, Step 1106. If the VDC is disabled (Step 1004, Yes) then the process returns a failed, step 1008 and returns to monitoring for new I/O requests, Step 1002. If the VDC is not disabled (Step 1006, NO) then the first storage device splits the request into sub-requests with page alignment, Step 1110.

The first data storage device 100 then determines if all the sub-request have been done, Step 1012. If all of the sub-requests are done (Step 1012, Yes) then the process returns to monitoring for new I/O requests, Step 1002. If all of the sub-requests are not done (Step 1012, No) then the process next determines if the request is a read or write I/O operation, Step 1014. If the requested I/O operation is a read operation (Step 1014, Read), then the first data storage device 100 reads the requested data from the persistent storage device 150 and communicates the requested data to the requester, Step 1030.

Figure 7B:
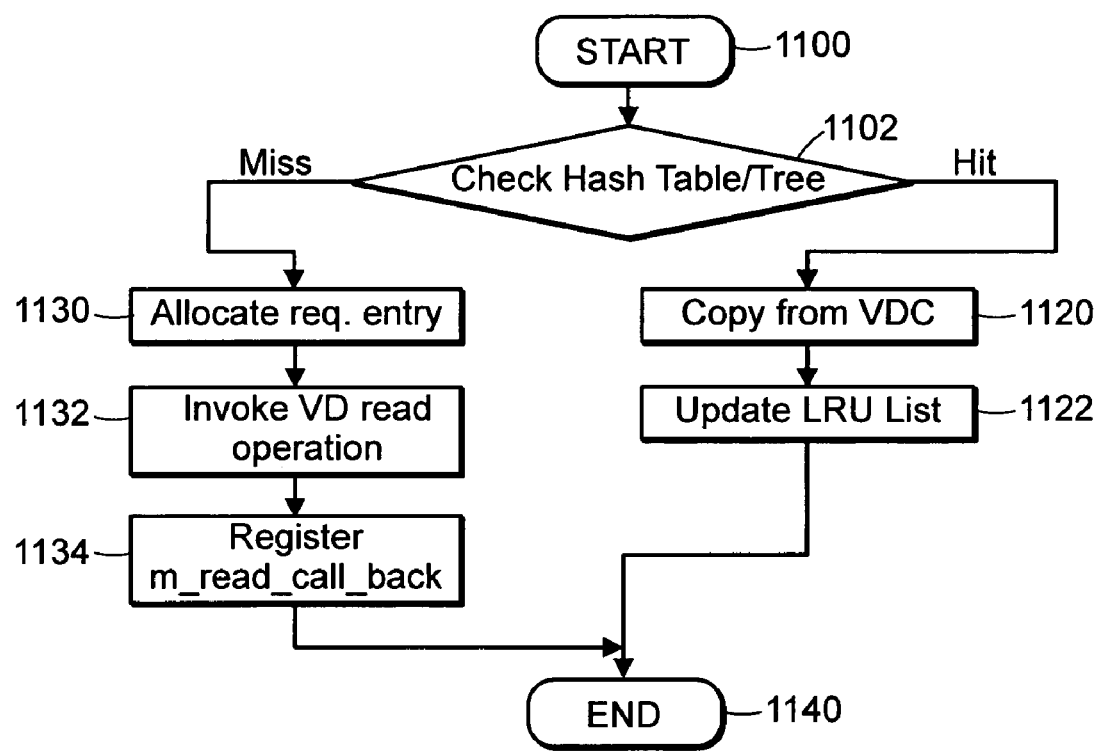

Now with reference to FIG. 7B, the read I/O process is started 1100 responsive to the determination that the requested I/O operation is a read (Step 1014, Read). After starting the read process, the first data storage device 100 checks the hash table/tree, step 1102. If it is determined that there is a hit from such checking (Step 1102, Hit) then the process continues with copying the information from the VDC, step 1120 and updates the last recently used (LRU) list, step 1122. Thereafter, the read process is ended, step 1140 and the read data is returned to the requestor.

If it is determined that there is a miss from such checking (Step 1102, Miss) then the process continues with allocating the requested entry (Step 1130), invoking a VD (Virtual Device) read operation (step 1132) and registering a read call back (step 1134). Thereafter the read process is ended, step 1140 and the read data is returned to the requestor.

Referring back to only FIG. 7A, if the requested I/O operation is a write operation (Step 1014, Write), then the first data storage device 100 initiates a duplicate writing of the data, Step 1020. More particularly, the first data storage device 100 undertakes a process to write the data to the persistent storage device 150, Step 1022 and also undertakes to initiate and perform a log system write, Step 1024. Upon completion of the write operations to the persistent storage device 150, the process returns to monitoring for new I/O requests, Step 1002. In an alternative embodiment, the process returns to monitoring upon completion of both write operations. In addition and as herein described, the first data storage device 100 returns a message or acknowledge (ack) signal to the requestor's workstation 2 in accordance with the particular mirroring mode being implemented to indicate to the application process running on the workstation that the requested write operation is complete. This also represents an indication that the data is stored in a storage device and capable of being later retrieved.

Figure 7C:
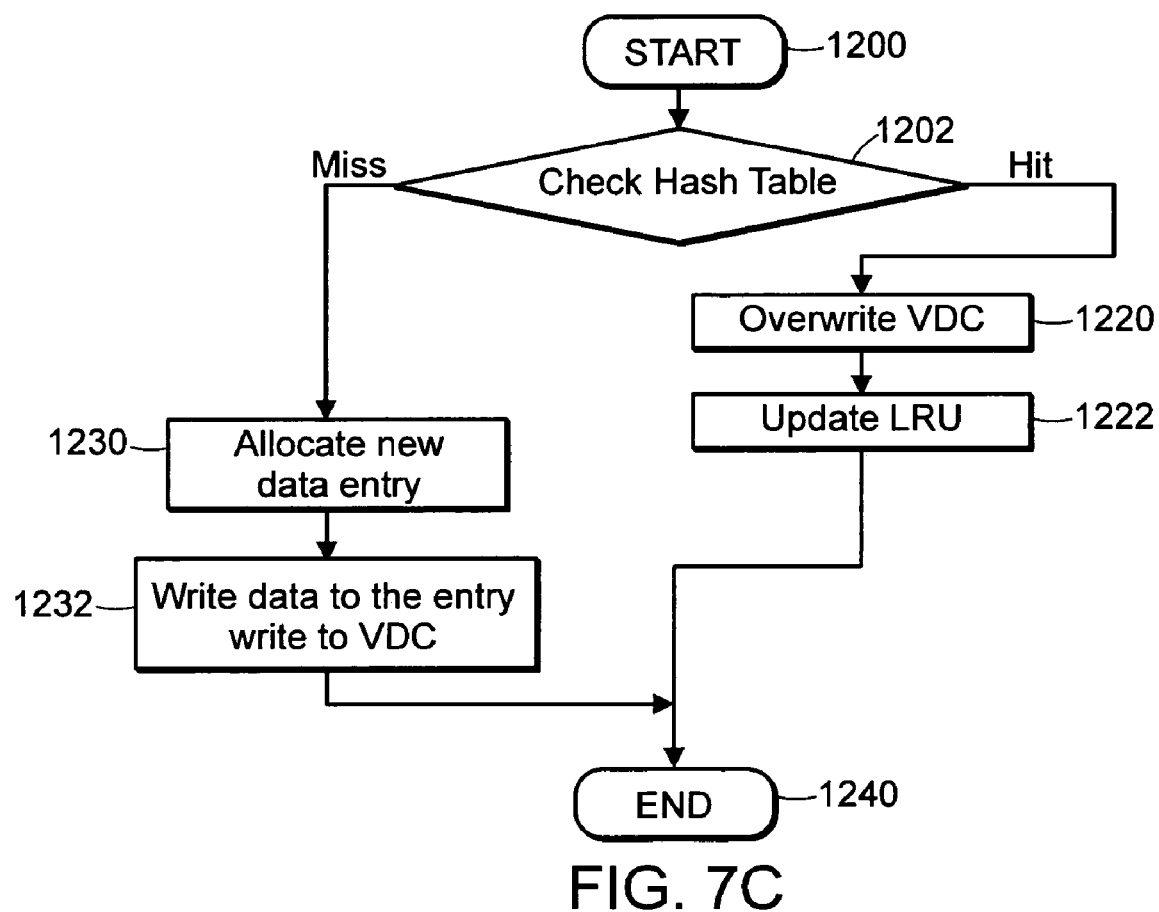

As to the writing of the data to the persistent storage device 150 of the first data storage device 100 and with reference also to FIG. 7C, the write read I/O process to the persistent storage device 150 is started 1200 responsive to the duplicative write I/O operation (Step 1020). After starting this process, the first data storage device 100 checks the hash table/tree, Step 1202. If it is determined that there is a hit from such checking (Step 1202, Hit) then the process continues with over writing the VDC, step 1220 and updating the last recently used (LRU) list, step 1222. Thereafter the write process is ended, step 1240 and a write acknowledgement is returned to the requestor (i.e., the application being run at the workstation by the requestor).

If it is determined that there is a miss from such checking (Step 1202, Miss) then the process continues with allocating a new data entry (Step 1230) and writing the new data to the VDC (step 1232). Thereafter the write process is ended, step 1140 and a write acknowledgement is returned to the requestor (i.e., the application being run at the workstation by the requestor).

Figure 7D:
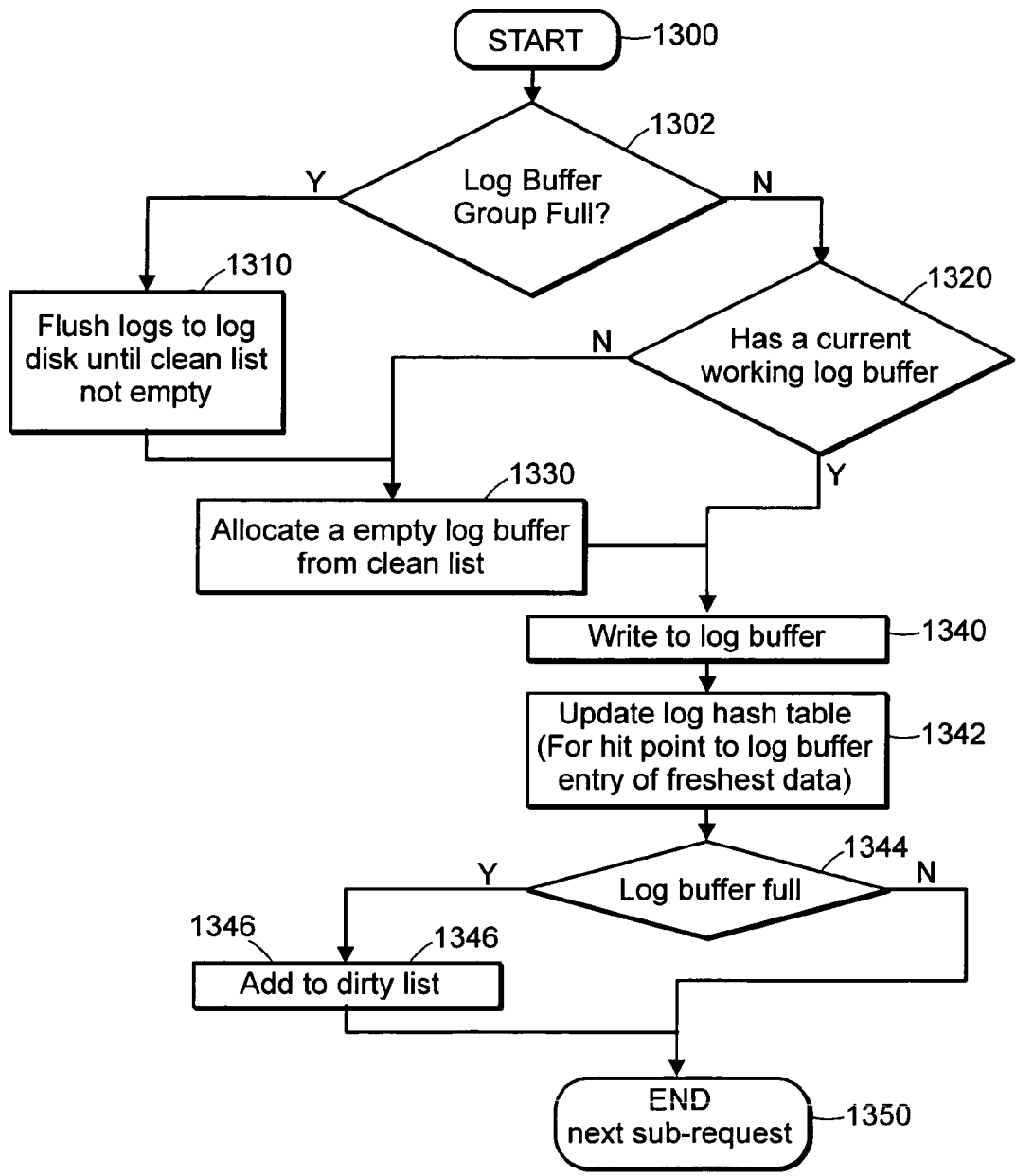

Now with reference to FIG. 7D, there is shown the duplicate write operation that is started, Step 1300 to write the received data in a different manner than that described in connection with FIG. 7C. After starting the process, the first data storage device 100 determines if the log buffer is full, Step 1302. If it is determined that the log buffer is full (Step 1302, Yes), then the logs cached in the memory 130 are flushed and sequentially written to the SAPS device/disk 140, Step 1310. This flushing is continued until the clean lists are not empty.

If it is determined that the log buffer is not full (Step 1302, No), then the first data storage device 100 determines if there is a current working log buffer associated with the data to be written. If it is determined that there is no current working buffer (Step 1320, No) or following flushing of the logs (Step 1310), the first data storage device 100 allocates an empty log buffer from the clean list, Step 1330. If it is determined that there is a current working buffer (Step 1320, Yes) or following allocation of an empty log buffer (Step 1330), the first data storage device 100 writes to the log buffer, Step 1340, and updates the hash table, Step 1342.

After updating the hash table (Step 1342) the first data storage device 100 determines if the log buffer is full following such writing to the log buffer, Step 1344. If the log buffer is full (Step 1344, Yes), the first data storage device 100 adds the log buffers to the dirty list, Step 1346. After adding the log buffers to the dirty list (Step 1346) or if it is determined that the log buffer is not full following such writing to the log buffer (Step 1344, No), then the write process is completed, Step 1350.

Figure 7E:
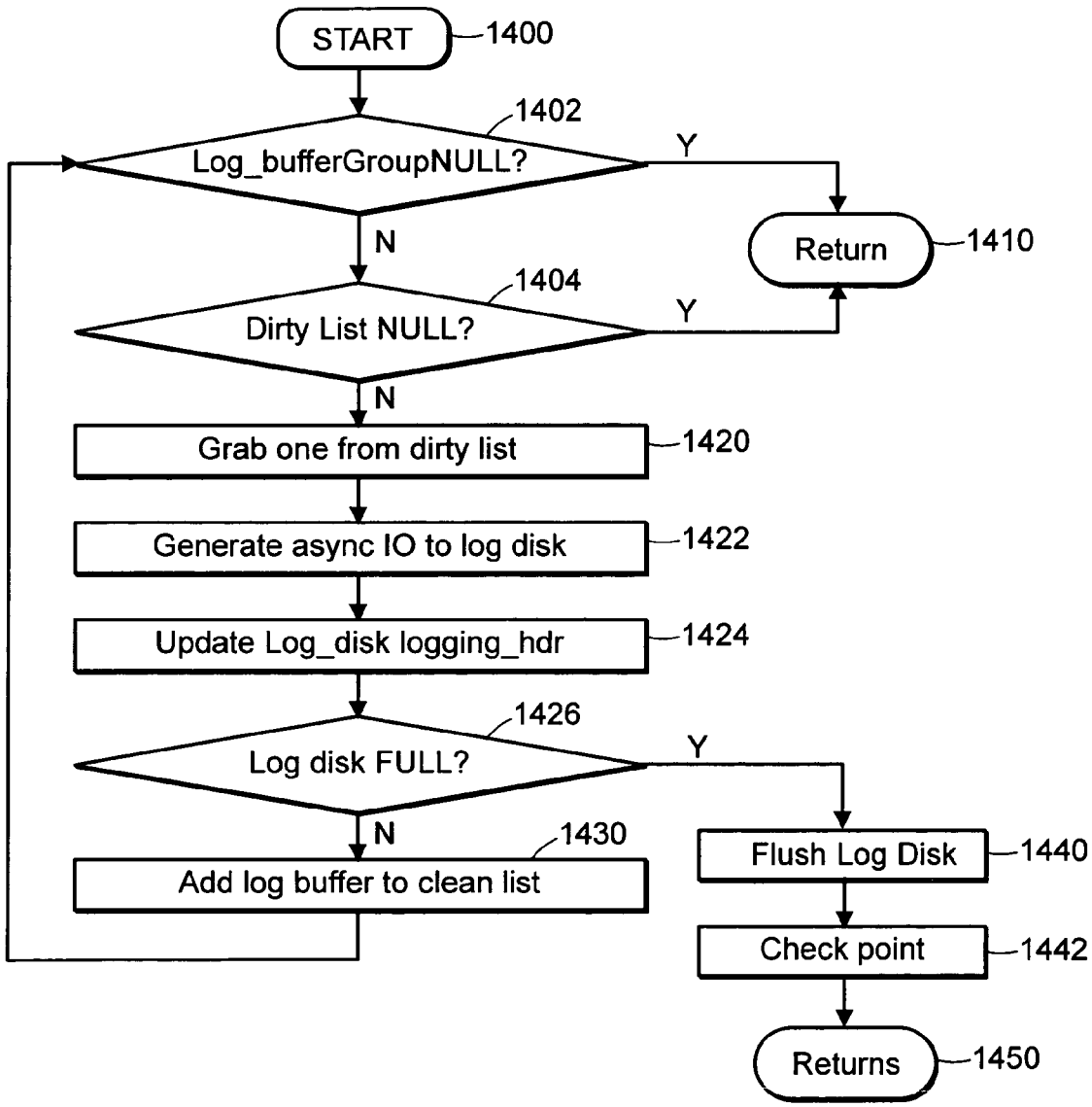

Referring now to FIG. 7E there is shown a process for writing or flushing logs to the SAPS device/disk 140. Responsive to a request to initiate log flushing, the first data storage device 100 starts the log flushing process, Step 1400. After this process is started, the first data storage device determines if the log buffer group and/or the dirty list is Null, steps 1402, 1404. If either is Null (Step 1402, Yes; Step 1403 Yes), then the process returns to the main processing flow process (FIG. 7A), Step 1410.

If neither is Null (Step 1402, No, Step 1404 No), then the first data storage device grabs a log from the dirty list, Step 1420; generates a sync I/O to the SAPS device/disk 140, Step 1422; and updates the log disk logging header listing to reflect the writing of the log to the SAPS device/disk, Step 1424. After writing the log to the SAPS device/disk 140, the first data storage device 100 determines if the SAPS device/disk is full, Step 1426. As indicated herein, the SAPS device/disk 140 can be a partition made in the persistent storage device disk 150.

If the SAPS device/disk 140 is determined to be full (Step 1426, Yes) then the first data storage device 100 flushes or downloads the contents of the SAPS device/disk 140 to the second data storage device 200, Step 1440; checks the pointer, Step 1442; and returns, Step 1450. If the SAPS device/disk 140 is determined not to be full (Step 1426, No) then the first data storage device 100 adds the log buffer for the log written to the SAPS device/disk 140 to the clean list, Step 1430. Thereafter the process returns to step 1402 and the process is repeated.

Figure 7F:
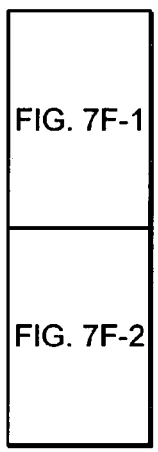
Figures 1, 7F:
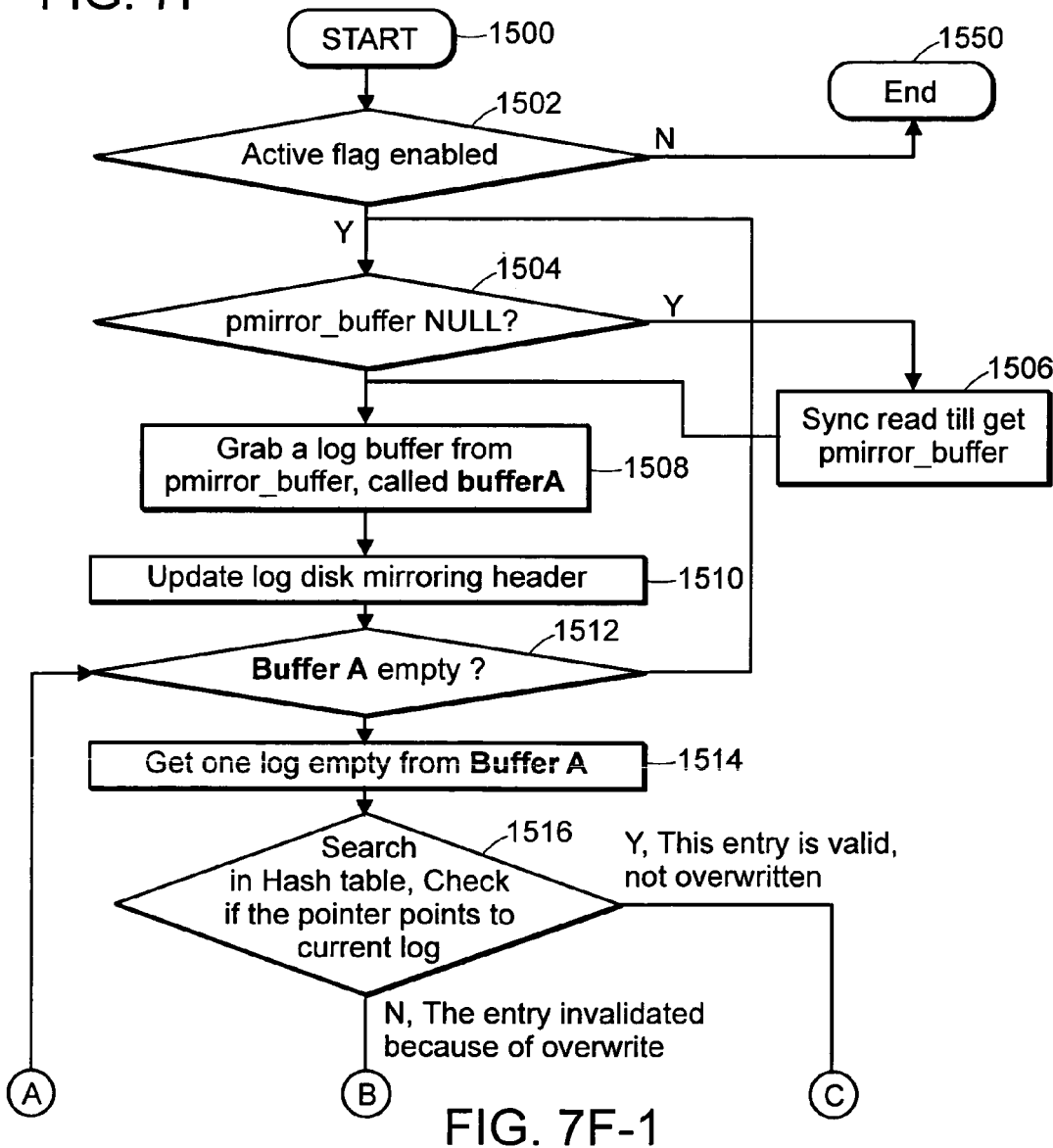
Figures 2, 7F:
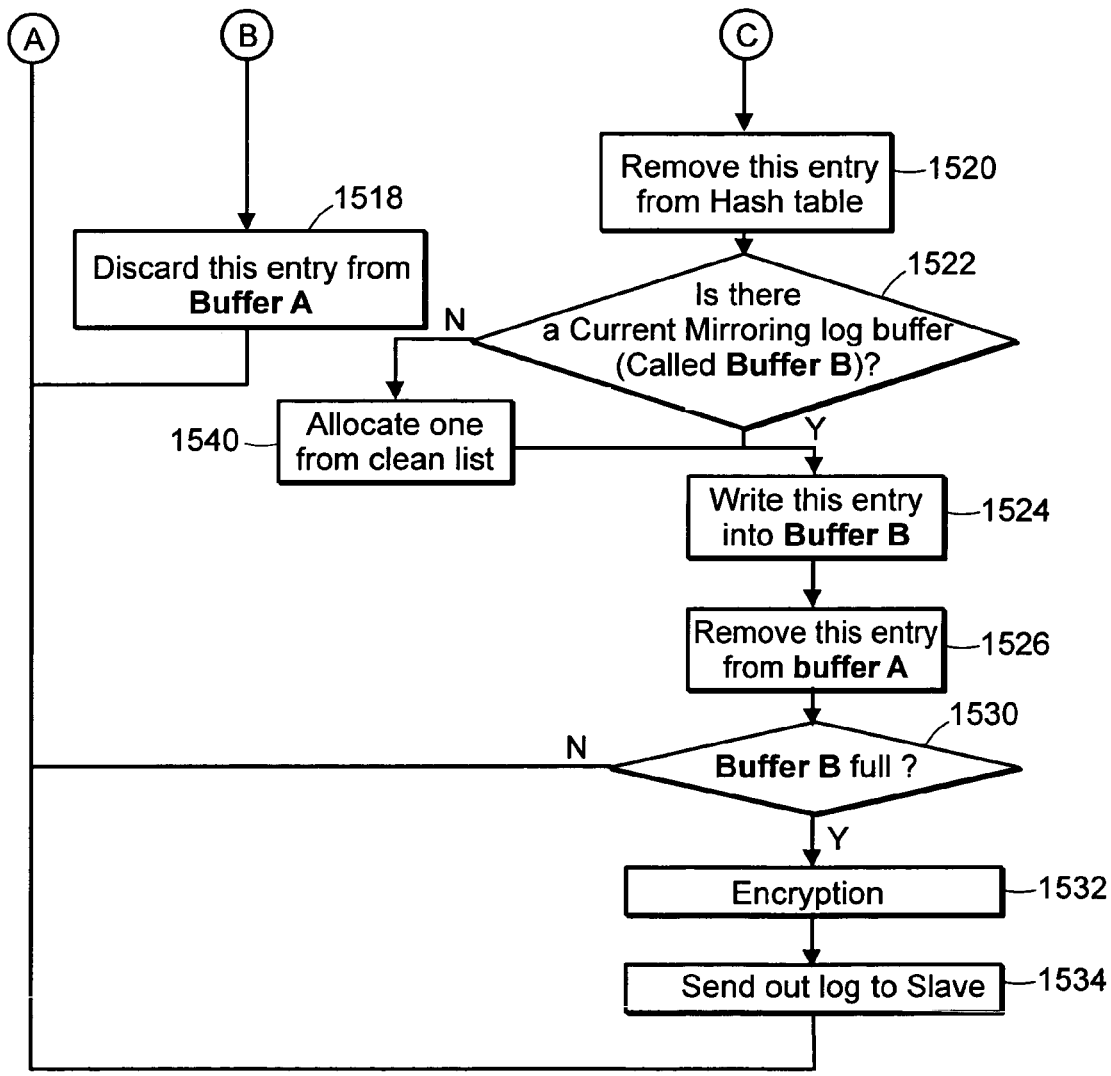

Referring now to FIG. 7F there is shown a process for flushing data from the first data storage device 100 for transmission to the second data storage device 200 located at a site remote from the location of the first data storage device. After the data storage back-up system 50 is initially configured for operation, the first data storage device 100 more particularly the program being executed thereon, is configured and arranged so as to start the process involved with flushing data to the second data storage device 200, Step 1500.

The first data storage device 100 first determines if the active flag is enabled, Step 1502. If the flag is not enabled (Step 1502, No), then the data flushing process is ended, Step 1550. If the active flag is enabled (Step 1502, Yes) then the first data storage device next determines if the pmirror buffer is null, Step 1504. If the pmirror buffer is null (Step 1504, Yes) then the first data storage device 200 performs a sync read operation till it gets the pmirror buffer, Step 1506.

Thereafter, or in the case where the pmirror buffer is not null (Step 1504, No), the first data storage device 100 grabs a log buffer, Step 1508, and also updates the log disk-mirroring header, Step 1510. The first data storage device 100 next determines if a given buffer is empty, Step 1512, and if it is not empty (Step 1512, No) the storage device 100 gets a log entry from the buffer. If the given buffer is empty (Step 1512, Yes) then the process returns to step 1504.

After grabbing a log entry, the first data storage device 100 searches the hash table to check to see if the pointer is pointing to the current log, Step 1516. If it is determined that the pointer is not pointing to the current log (Step 1518, No) then the entry from the buffer is discarded (Step 1518) and the process returns to step 1512. In this case, the entry is considered to be invalid because it is overwritten.

If the pointer is pointing to the current log (Step 1516, Yes) then the entry is valid and not overwritten. Thus, the first data storage device 100 removes this entry from the hash table, Step 1520. The first data storage device 100 next determines if there is a current mirroring log buffer, Step 1522. If there is not current buffer (Step 1522, No) then one is allocated from the clean list, Step 1540. After allocating one from the clean list (Step 1540) or after determining that there is a current buffer (Step 1522, Yes), then the entry is written to the mirroring buffer, Step 1524 and the entry is removed from the other buffer, Step 1526.

The first data storage device 100 next determines if the mirroring buffer is full, Step 1530, and if the buffer is not full (Step 1530, No), then the process returns to step 1512. If the buffer is full (Step 1530, Yes), then the first data storage device 100 encrypts the buffered entry, Step 1532 and then transmits the encrypted data log to the second data storage device 200, Step 1534. As indicated herein, it also is contemplated that for such transmissions, the process can include the use of data compression techniques as well as encryption. Thereafter, the process returns to step 1512.

Figure 7G:
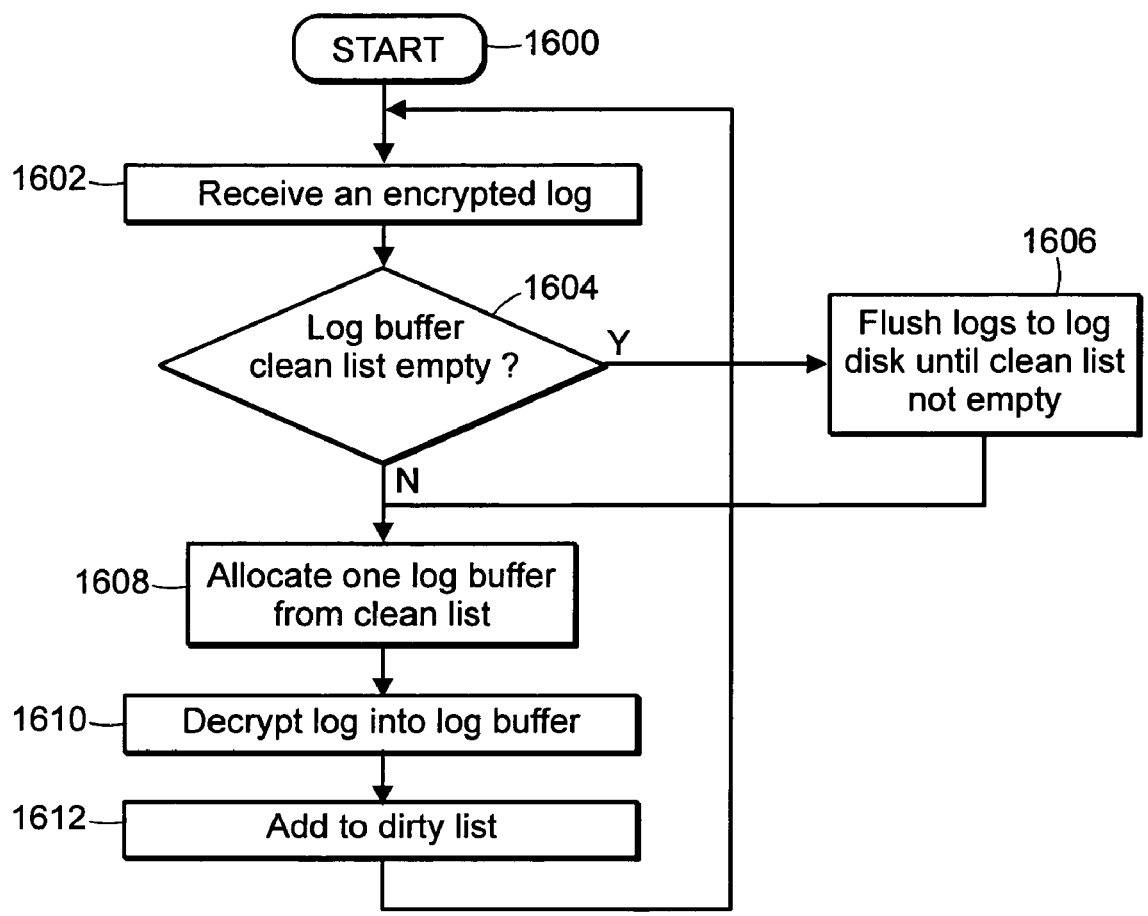

Referring now to FIG. 7G, there is shown a process performed by the second data storage device 200 to receive the encrypted data log transmissions (or the compressed and/or encrypted data log transmissions) from the first data storage device 100. After the data storage back-up system 50 is initially configured for operation, the second data storage device 200 more particularly the program being executed thereon, is configured and arranged so as to start the process involved with receiving the data being flushed or transmitted from the first data storage devices (as described above in regards to FIG. 7F) to the second data storage device 200, Step 1600.

The second data storage device 200 receives the encrypted log (or the compressed and/or encrypted log) from the first data storage device 100, Step 1602; and determines if the log buffer clean list is empty, Step 1604. If it is determined that the clean list is empty (Step 1604, Yes), the second data storage device 200 flushes logs to the SAPS device/disk 140 for the second data storage device 200, Step 1606 until the clean list is not empty. After so flushing the logs (Step 1606) or if it is determined that the clean list is not empty (Step 1604, No) then one log buffer is allocated from the clean list, Step 1608; the encrypted log is decrypted (or decompressed and decrypted if compressed and encrypted) and written to log buffer, Step 1612; and added to the dirty list, Step 1612. Thereafter the process returns to step 1602.

Figure 7H:
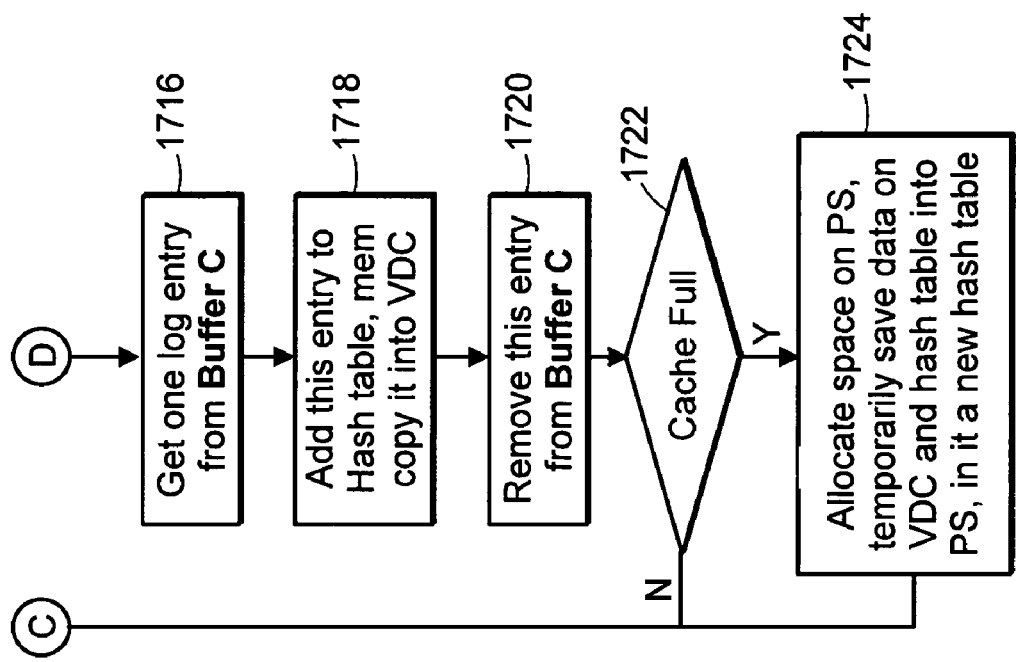
Figure 2:
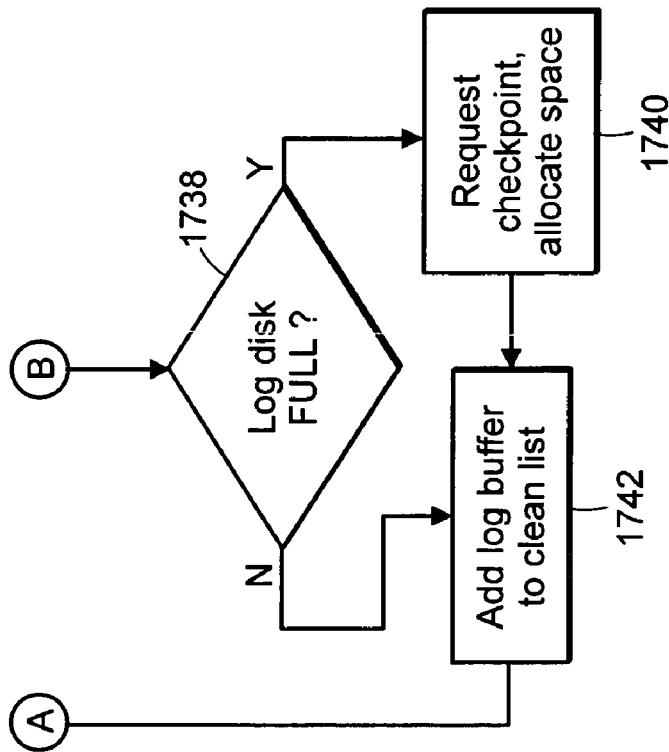
Figures 2, 71:
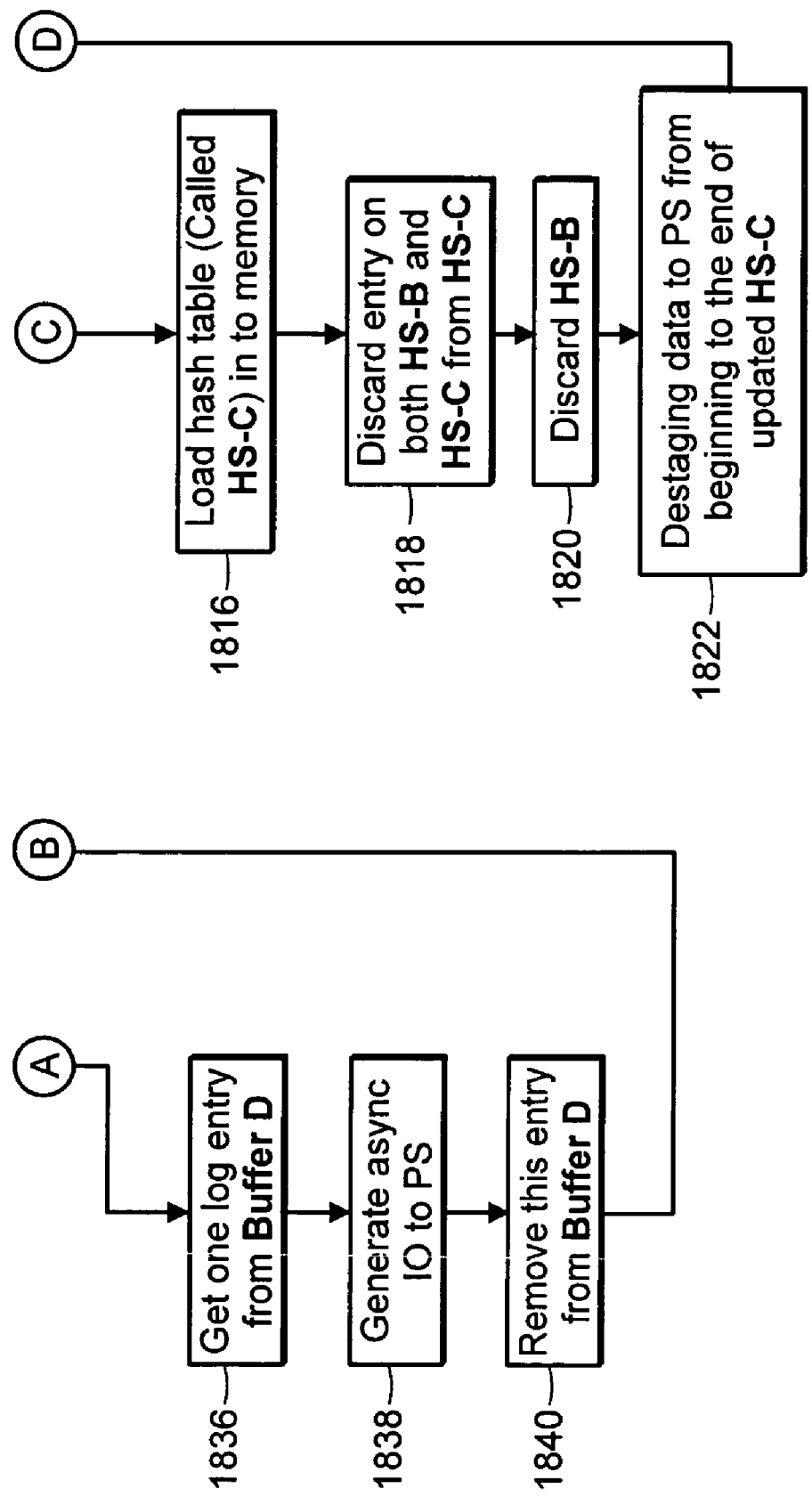

Referring now to FIG. 7H, there is shown a process for flushing the buffered logs to the SAPS device/disk 150 of the second data storage device 200. After the data storage back-up system 50 is initially configured for operation, the second data storage device 200 more particularly the program being executed thereon, is configured and arranged so as to start the process involved with flushing data logs, Step 1700. After starting this process, the second data storage disk 200 determines if the SAPS device/disk 150 thereof is activated, Step 1702.

If it is determined that the SAPS device/disk 150 is not activated (Step 1702, No), an indication that there is only a log buffer, then the second data storage device next determines if the dirty data list is empty, Step 1710. If it is determined that the dirty list is not empty (Step 1710, No), then one log from the dirty list is retrieved, Step 1712. Next a determination is made to see if the buffer of the retrieved log is empty, Step 1714. If it is determined that the buffer is not empty (Step 1714, No), then one log entry is gotten from this buffer, Step 1716.

Then this entry is added to the hash table, memory 130 and copied into the VDC, Step 1718; and the entry is removed from the buffer, Step 1720. The second data storage device 200 next makes a determination to see if the cache is full, Step 1722; and if the cache is not full (Step 1722, No) then the process returns to Step 1714 and the above-described process is repeated. If the cache is determined to be full (Step 1722, Yes), then space is allocated on the SAPS device/disk 140 of the second data storage device 200, the data on the VDC and hash table is saved to this SAPS device/disk, and a new hash table is initiated, Step 1724. After completing this, the process returns to Step 1714 and the above-described process is repeated.

If a determination is made that the SAPS device/disk 140 of the second data storage device 200 is activated (Step 1702, Yes), an indication that the SAPS device/disk holds data logs, then the second data storage device next determines if the dirty data list is empty, Step 1730. If it is determined that the dirty list is not empty (Step 1730, No), then one log from the dirty list is retrieved, Step 1732. The second data storage device 200 then generates a sync I/O signal to write to the SAPS device/disk 140 thereof.

Thereafter, the log disk logging header listing is updated, Step 1736, and a determination is made to see if the SAPS device/disk 140 is full, Step 1738. If the SAPS device/disk 140 is determined to be full (Step 1738, Yes) then the process continues with a request for check point and to allocate space, Step 1740. Thereafter, or in the case where it is determined that the SAPS device/disk 140 is not full (Step 1738, No), then the log buffer is added to the clean list, Step 1742, thereby indicating that the log buffer has been written to the SAPS device/disk.

If it is determined that the dirty list is empty (either Step 1710, Yes or Step 1730, Yes) then the process waits until the dirty list is not empty, Step 1750. Thereafter, the process returns to steps 1710 and 1730 respectively.

Referring now to FIG. 7I, there is shown a process for de-staging data from the SAPS device/disk 140 to the persistent disk 150, both of the second storage device 200. In more particular embodiments of the present invention, and as also described herein, this de-staging process need not be performed in conjunction with the flushing or transmission of the data logs from the first data storage device 100 to the second data storage device 200. After the process is started, Step 1802; the second data storage device 200 determines if the SAPS device/disk 140 thereof is activated, Step 1802.

If it is determined that the SAPS device/disk 150 is not activated (Step 1802, No), then a new hash table (HS-A) is initiated to handle the new request, Step 1810, and the data is de-staged to the persistent storage device/disk 150 sequentially from the beginning to the end of the hash table (called HS-B), Step 1812. A determination also is the made to see if the temporary data is on the persistent storage device/disk 150, Step 1814, and if the temporary data is not found on the persistent storage device/disk 150 (Step 1814, No), then HS-B is discarded and the process is ended, Steps 1815, 1850.

If temporary data is found on the persistent storage device/disk 150 (Step 1814, Yes) then the hash table is loaded into the memory 130 and called HS-C, Step 1816. The entry that is on both HS-B and HS-C is then discarded from HS-C and then HS-B is discarded, Steps 1818, 1820. The data is then de-staged to the persistent storage device/disk 150 of the second data storage device 200 from the beginning to the end of the updated HS-C, Step 1822. Thereafter, the process returns to Step 1814.

If it is determined that the SAPS device/disk 140 is activated (Step 1802, Yes), then a determination is made to see if the SAPS device/disk is empty, Step 1830, and if it is determined that it is empty (Step 1830, Yes) then the process is ended, Step 1850. If it is determined that the SAPS device/disk 140 is not empty (Step 1830, Yes), then a log is read from the SAPS device/disk and called a particular buffered log, Step 1832. A determination is then made to see if this particular buffer is empty, Step 1834. If it is determined that the particular buffer is empty (Step 1834, Yes) then the log disk destaging header list is appropriately updated, Step 1842, and the process returns to Step 1830.

If it is determined that the particular buffer is not empty (Step 1834, No), then one log entry is retrieved/gotten from the particular buffer (Step 1836) and a sync I/O signal to write the retrieved log data to the persistent storage device/disk 150 is generated (Step 1838). This entry is then removed from the particular buffer (Step 1840) and the process returns to Step 1834.

In sum, the data storage back-up system 50 of the present invention including the program(s) for execution therein as well as the methodology of the present invention advantageously yield a system that provides synchronous/asynchronous remote mirroring using industry standard network protocols, such as but not limited to iSCSI and/or TCP/IP. Also, the data storage back-up systems 50 of the present invention also advantageously mirror a users' data upon every change on a host at block level in seconds or less.

Once installed, the data replication/mirroring process of the present invention is undertaken so as to be transparent to users. Further, in the storage system 50 of the present invention every write operation is done in two places, local storage and remote storage/sites. In comparison to commercial systems, there is no need to run another time-consuming program to do mirroring/replication since every change is being mirrored to another data storage in the present invention when a local write is performed.

Further, with the present invention data protection (i.e., mirroring/replication/back-up) is accomplished within intervals of seconds as opposed to a day or half of a day using other existing file-based backup software such as that being used by small and medium size businesses. As also indicated herein, the data storage devices 100, 200 and the data storage back-up systems 50 of the present invention support fully any of a number of communication protocols. In particular, the devices 100, 200 and systems 50 of the present invention support the native iSCSI protocol that was ratified by the Internet Engineering Task Force. The iSCSI allows block level storage data to be transported over the popular TCP/IP network that can cover a wide area across cities and states and is also perceived as a low cost alternative to the FC protocol for remote storage.

The effectiveness of the data storage back-up device 50 of the present invention as compared to a conventional iSCSI system can be seen from the following examples.

EXAMPLE 1

Figure 8B:
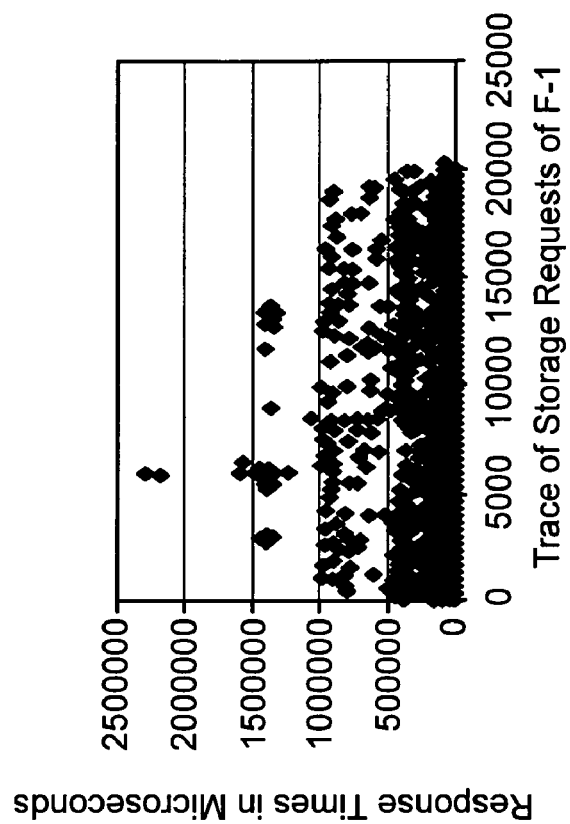
FIGS. 8A,B are graphical views of response time versus storage requests for one financial type of user when using the storage system/apparatus of the present invention (FIG. 8A) and when using a conventional iSCSI storage system (FIG. 8B)
FIGS. 8C,D are graphical views of response time versus storage requests for another financial type of user when using the storage system/apparatus of the present invention (FIG. 8C) and when using a conventional iSCSI storage system (FIG. 8D)
Figure 8A:
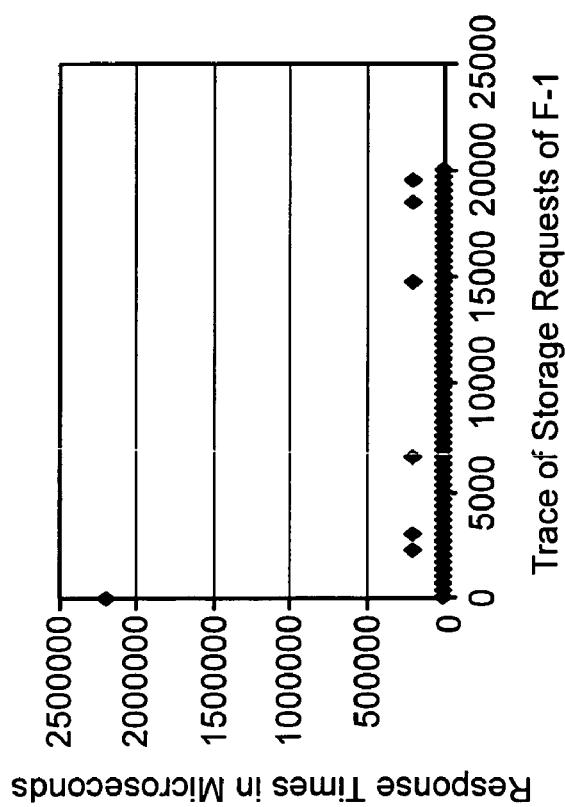
Figure 8D:
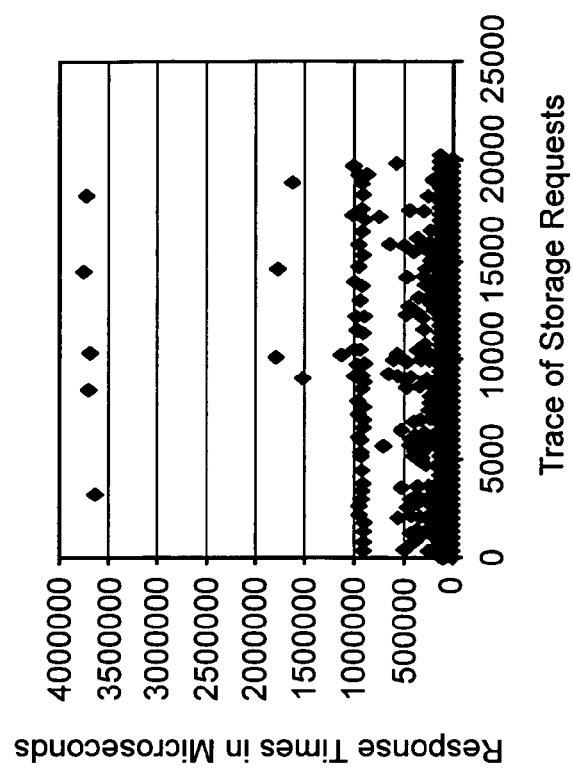
Figure 8C:
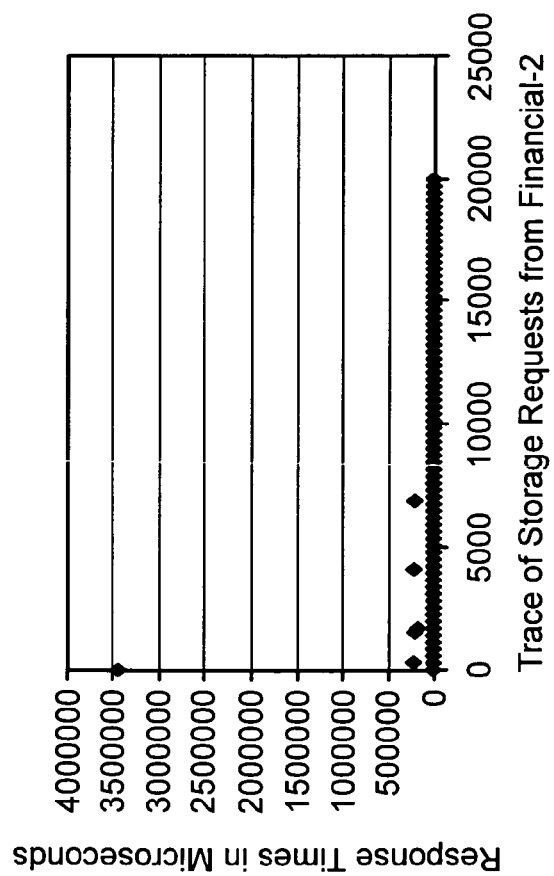

Referring to FIGS. 8A, B there are shown graphical views of response time versus storage requests for a financial type of user when using the storage system/apparatus of the present invention (FIG. 8A) and when using a conventional iSCSI storage system (FIG. 8B). Also, referring to FIGS. 8C, D, there are shown graphical views of response time versus storage requests for another financial type of user when using the storage system/apparatus of the present invention (FIG. 8C) and when using a conventional iSCSI storage system (FIG. 8D). It can be seen from these graphical views that the response time for a storage device embodying the principals, methodology and devices of the present invention is consistently better than for a conventional storage system embodying iSCSI techniques.

Figure 9A:
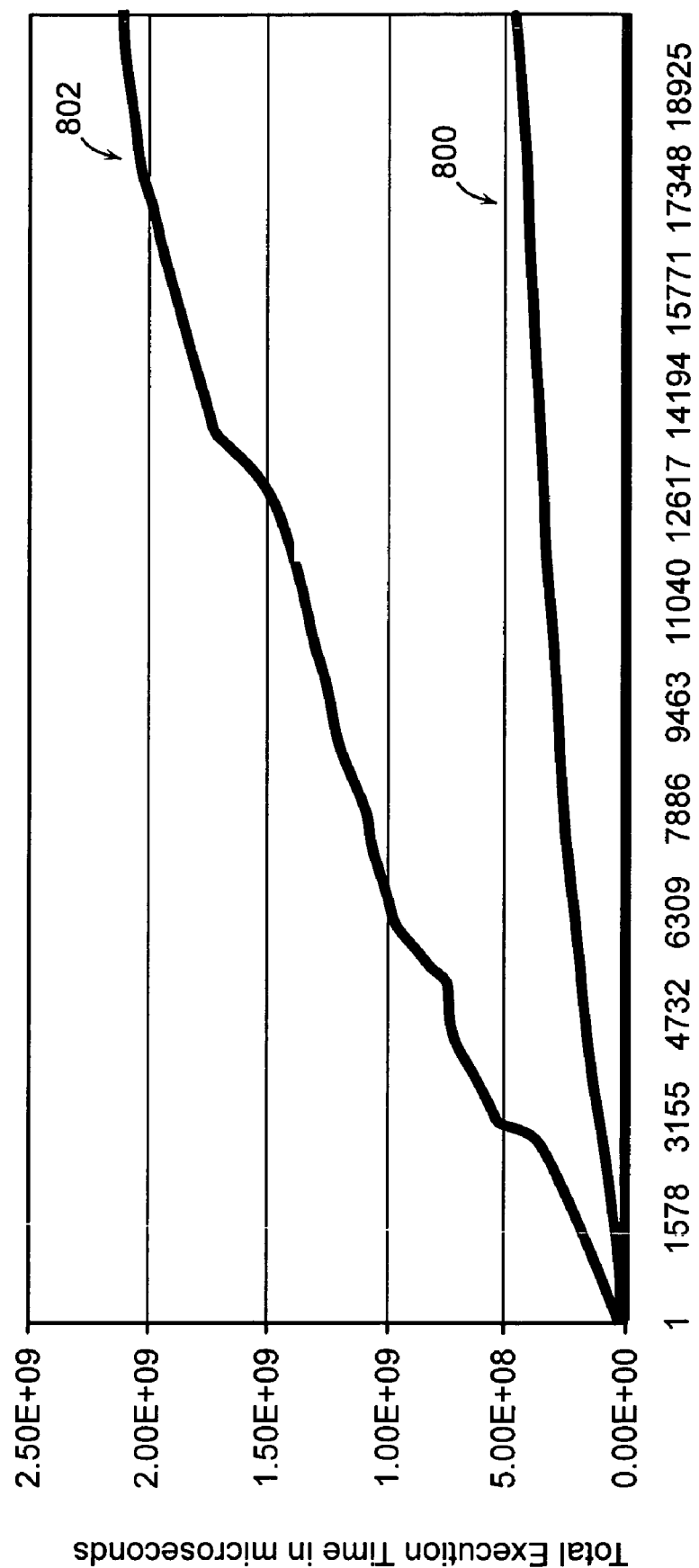
FIG. 9A is a graphical view illustrating execution time at an application server for said one financial type of user when using the storage system/apparatus of the present invention and when using a conventional iSCSI storage system.
Figure 9B:
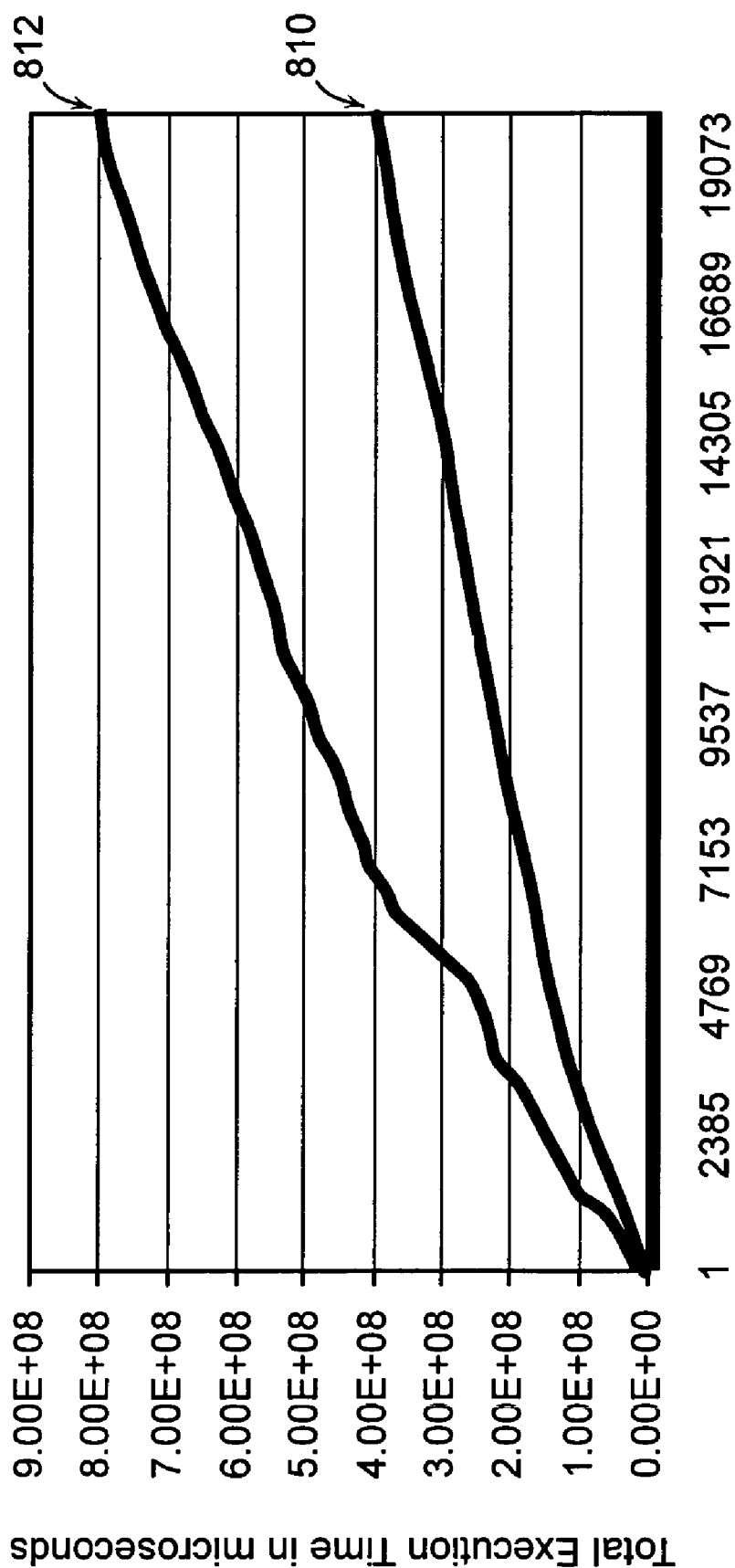
FIG. 9B is a graphical view illustrating execution time at an application server for said another financial type of user when using the storage system/apparatus of the present invention and when using a conventional iSCSI storage system.

Referring now also to FIGS. 9A, B there are shown graphical views that illustrate execution time at an application server for the two different financial types when using the storage system/apparatus of the present invention and when using a conventional iSCSI storage system. Comparing the curves 800, 810 corresponding to the storage system of the present invention with the curves 802, 812 corresponding to the conventional storage system with iSCSI, the response time for a system according to the present invention is improved as compared to the conventional storage system as the number of requests increases.

EXAMPLE 2

Figure 10A:
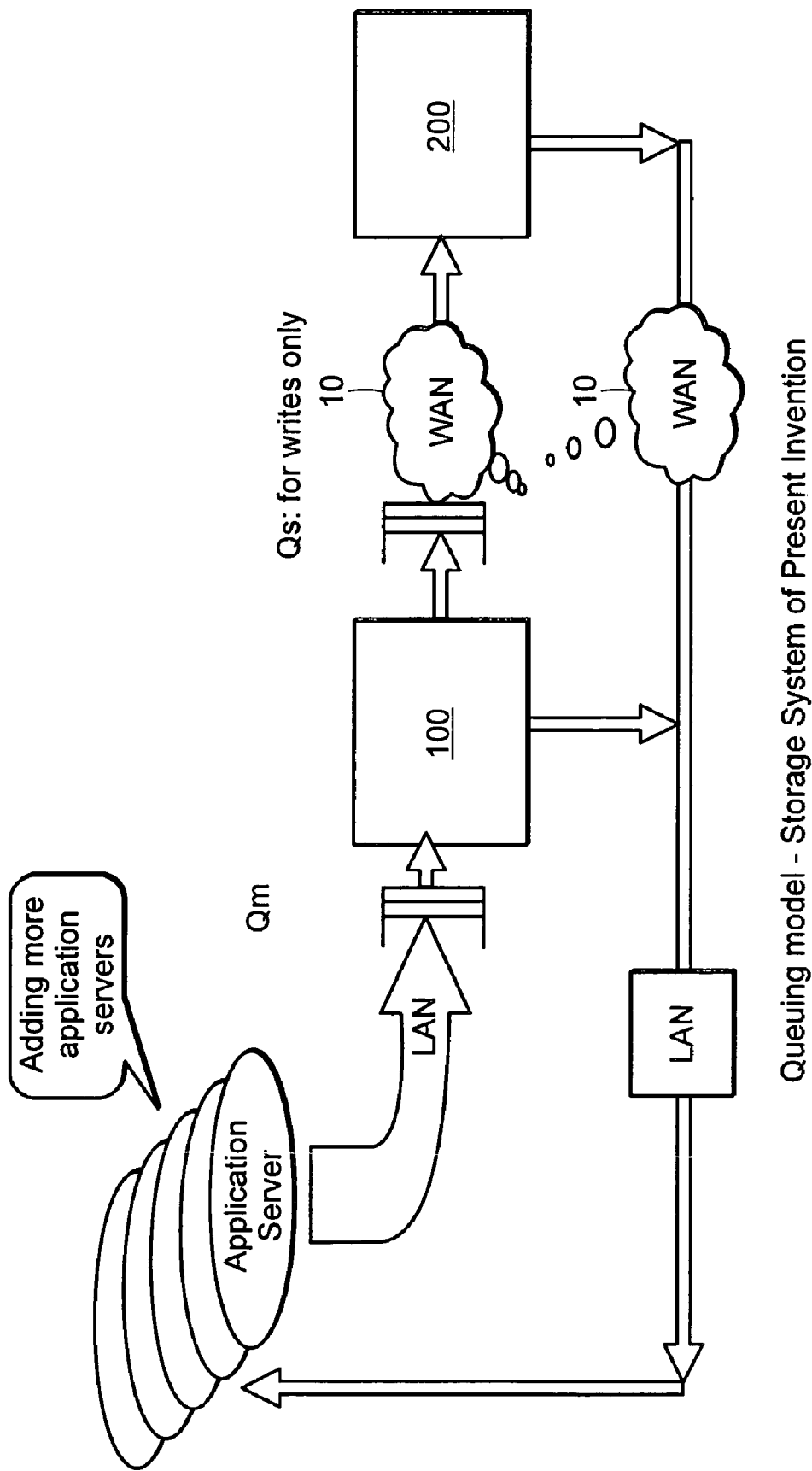
FIGS. 10A,B are illustrative views of a queuing model for the storage system/apparatus of the present invention (FIG. 10A) and for a conventional iSCSI storage system (FIG. 10B)
Figure 10B:
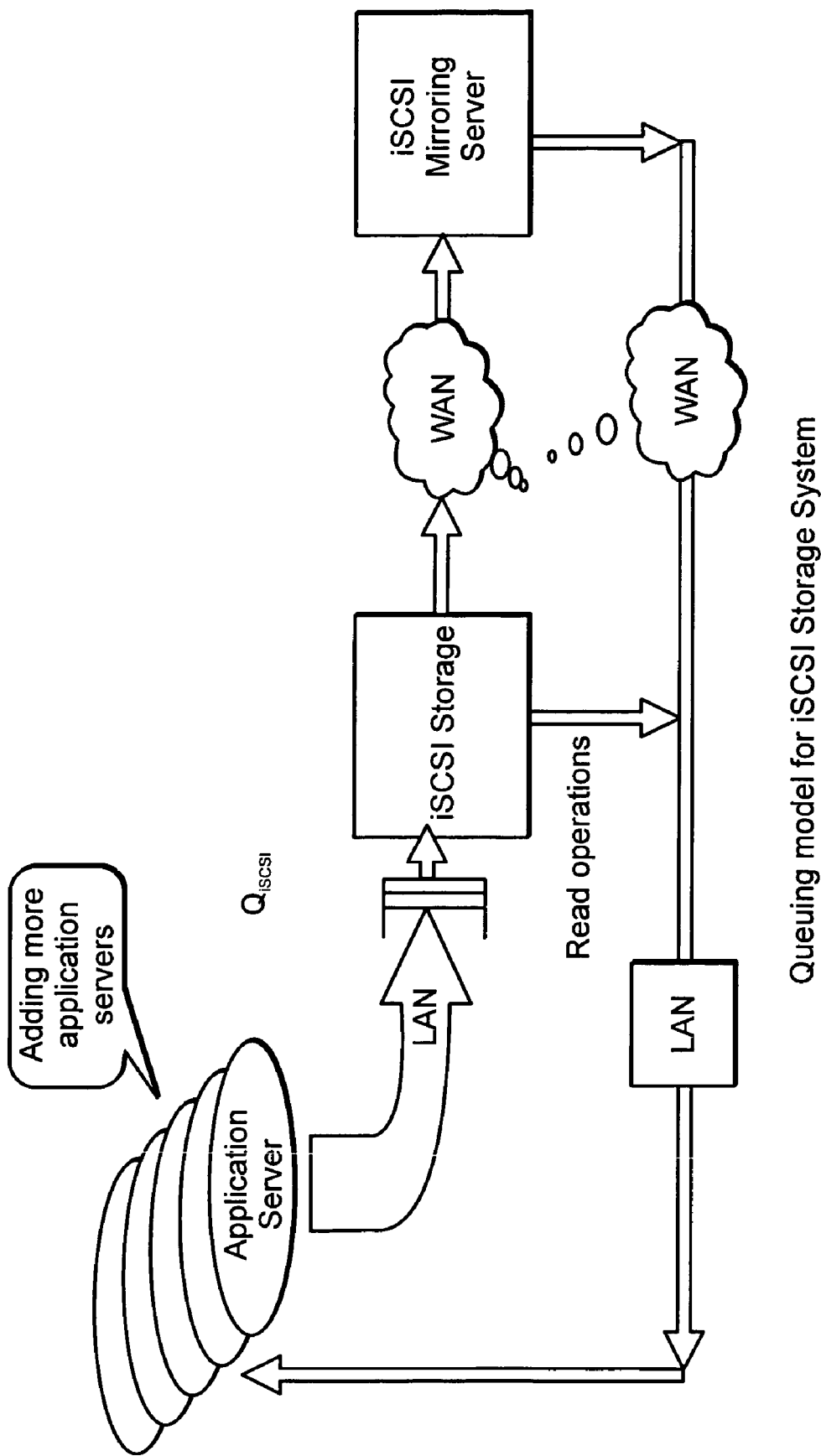

Referring now to FIGS. 10A, B there are shown illustrative views of a queuing model for the storage system/apparatus of the present invention (FIG. 10A) and for a conventional iSCSI storage system (FIG. 10B). Using these queuing models scalability analysis were performed to evaluate that scalability of these queuing models for differing communication speed capabilities for the WAN.

Figure 11B:
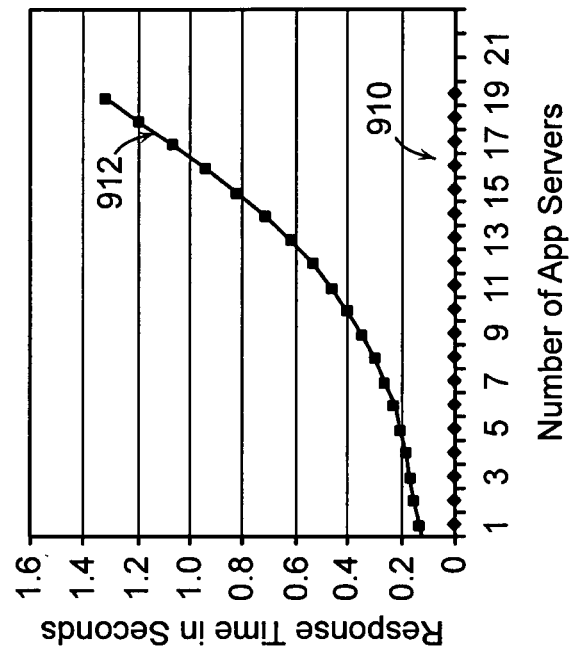
FIG. 11B is a graphical view of a scalability analysis of I/O response time versus number of servers when using the storage system/apparatus of the present invention and when using a conventional iSCSI storage system when either is connected to a 256 Kbps WAN.
Figure 11A:
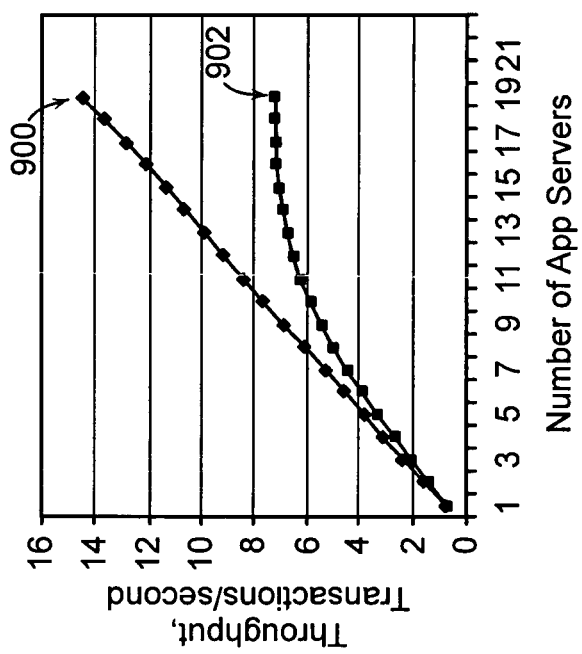
FIG. 11A is a graphical view of a scalability analysis of throughput versus number of servers when using the storage system/apparatus of the present invention and when using a conventional iSCSI storage system when either is connected to a 256 Kbps WAN.

Referring now to FIGS. 11A, B there is shown a graphical view of a scalability analysis of throughput versus number of servers when using the storage system/apparatus of the present invention and when using a conventional iSCSI storage system when either is connected to a 256 Kbps WAN (FIG. 11A) and a graphical view of a scalability analysis of I/O response time versus number of servers when using the storage system/apparatus of the present invention and when using a conventional iSCSI storage system when either is connected to a 256 Kbps WAN (FIG. 11B). Comparing the curves 900, 910 corresponding to the storage system of the present invention with the curves 902, 912 corresponding to the conventional storage system with iSCSI, the scalability of a system according to the present invention improves as compared to the conventional storage system as the number of servers increases.

Figure 11D:
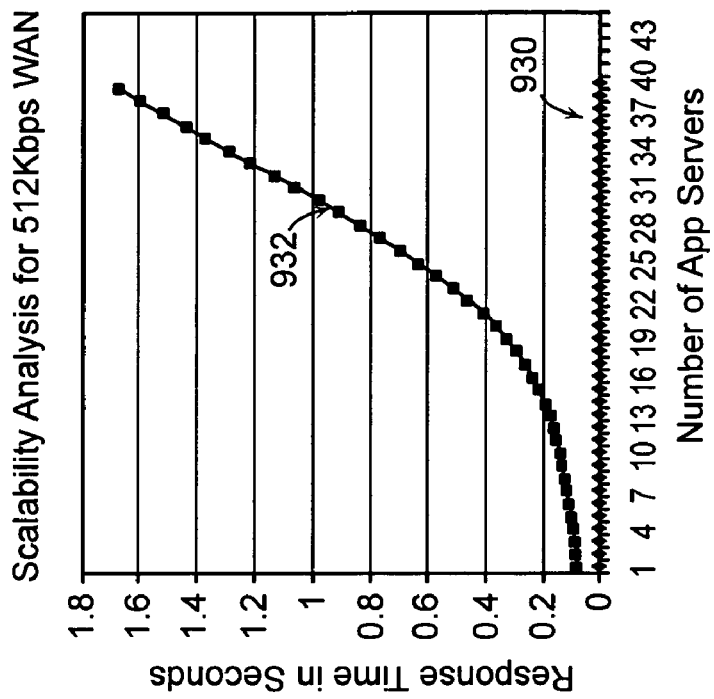
FIG. 11D is a graphical view of a scalability analysis of I/O response time versus number of servers when using the storage system/apparatus of the present invention and when using a conventional iSCSI storage system when either is connected to a 512 Kbps WAN.
Figure 11C:
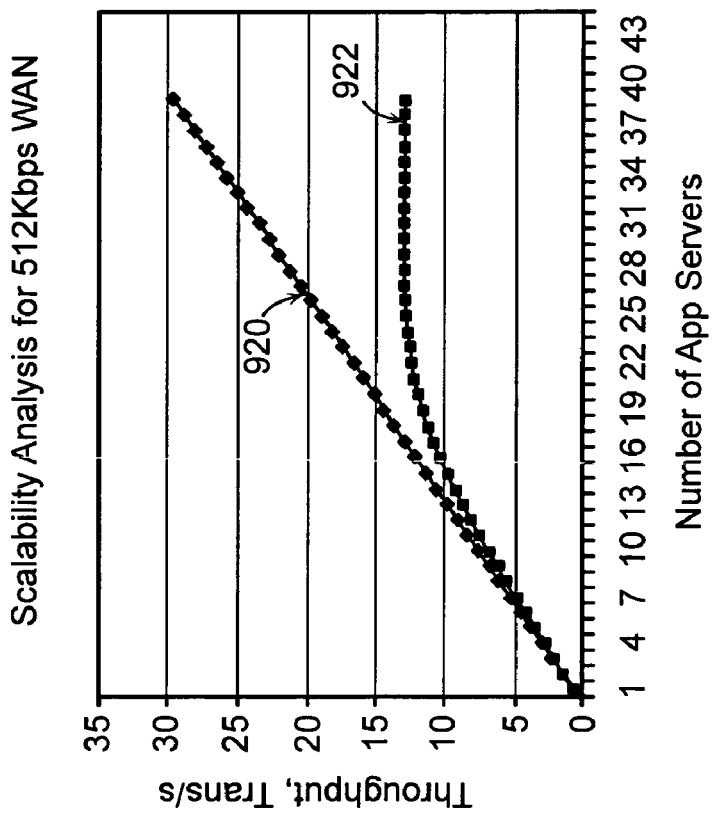
FIG. 11C is a graphical view of a scalability analysis of throughput versus of number of servers when using the storage system/apparatus of the present invention and when using a conventional iSCSI storage system when either is connected to a 512 Kbps WAN.

Referring now to FIGS. 11C, D there is shown a graphical view of a scalability analysis of throughput versus number of servers when using the storage system/apparatus of the present invention and when using a conventional iSCSI storage system when either is connected to a 512 Kbps WAN (FIG. 11C) and a graphical view of a scalability analysis of I/O response time versus number of servers when using the storage system/apparatus of the present invention and when using a conventional iSCSI storage system when either is connected to a 512 Kbps WAN (FIG. 11D). Comparing the curves 920, 930 corresponding to the storage system of the present invention with the curves 922, 932 corresponding to the conventional storage system with iSCSI, the scalability of a system according to the present invention improves as compared to the conventional storage system as the number of servers increases.

Figure 11F:
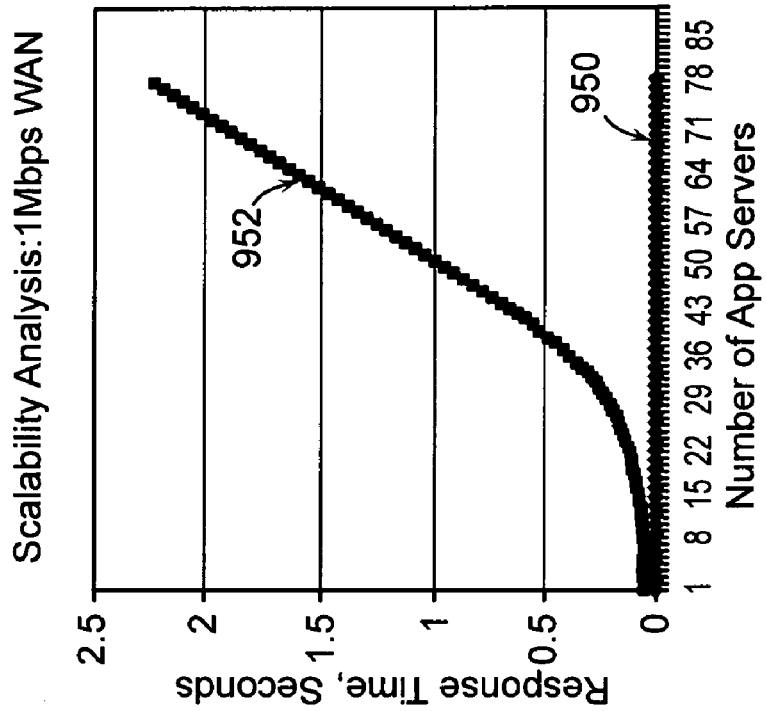
FIG. 11F is a graphical view of a scalability analysis of I/O response time versus number of servers when using the storage system/apparatus of the present invention and when using a conventional iSCSI storage system when either is connected to a 1 Mbps WAN.
Figure 11E:
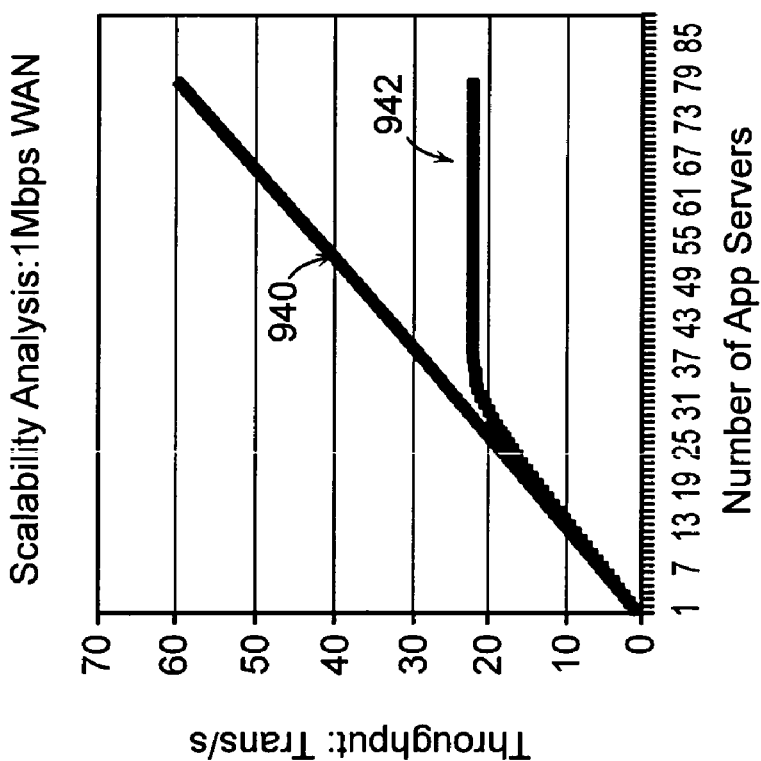
FIG. 11E is a graphical view of a scalability analysis of throughput versus number of servers when using the storage system/apparatus of the present invention and when using a conventional iSCSI storage system when either is connected to a 1 Mbps WAN.

Referring now to FIGS. 11E, F there is shown a graphical view of a scalability analysis of throughput versus number of servers when using the storage system/apparatus of the present invention and when using a conventional iSCSI storage system when either is connected to a 1 Mbps WAN (FIG. 11E) and a graphical view of a scalability analysis of I/O response time versus number of servers when using the storage system/apparatus of the present invention and when using a conventional iSCSI storage system when either is connected to a 1 Mbps WAN (FIG. 11F). Comparing the curves 940, 950 corresponding to the storage system of the present invention with the curves 942, 952 corresponding to the conventional storage system with iSCSI, the scalability of a system according to the present invention improves as compared to the conventional storage system as the number of servers increases.

Figure 11H:
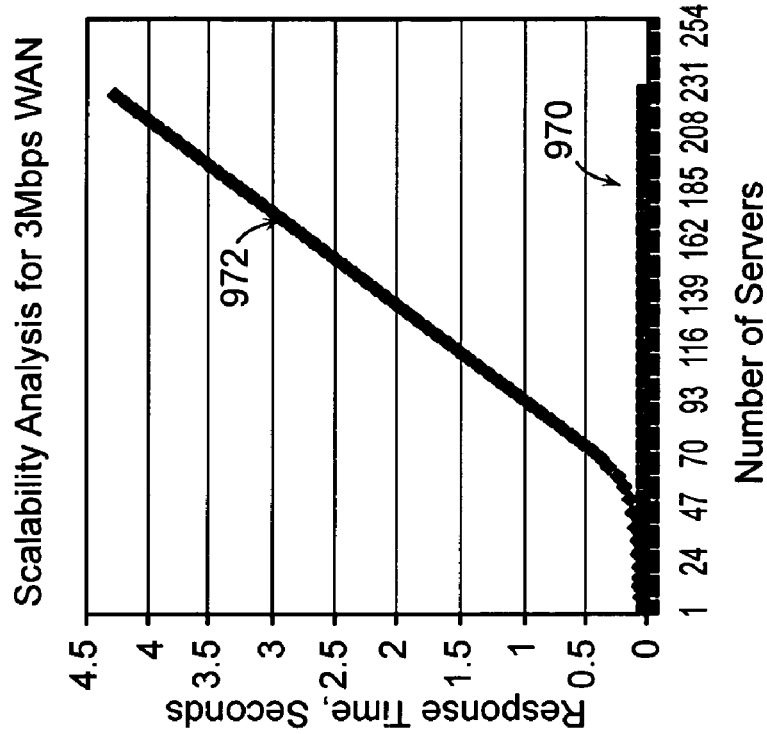
FIG. 11H is a graphical view of a scalability analysis of I/O response time versus number of servers when using the storage system/apparatus of the present invention and when using a conventional iSCSI storage system when either is connected to a 3 Mbps WAN.
Figure 11G:
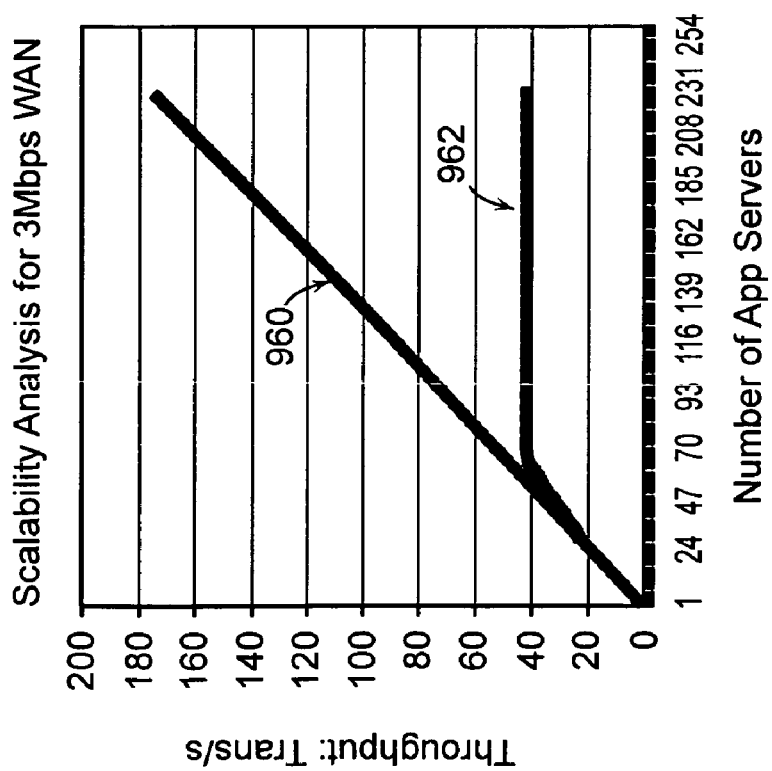
FIG. 11G is a graphical view of a scalability analysis of throughput versus number of servers when using the storage system/apparatus of the present invention and when using a conventional iSCSI storage system when either is connected to a 3 Mbps WAN.

Referring now to FIGS. 11G, H there is shown a graphical view of a scalability analysis of throughput versus number of servers when using the storage system/apparatus of the present invention and when using a conventional iSCSI storage system when either is connected to a 3 Mbps WAN (FIG. 11G) and a graphical view of a scalability analysis of I/O response time versus number of servers when using the storage system/apparatus of the present invention and when using a conventional iSCSI storage system when either is connected to a 3 Mbps WAN (FIG. 11H). Comparing the curves 960, 970 corresponding to the storage system of the present invention with the curves 962, 972 corresponding to the conventional storage system with iSCSI, the scalability of a system according to the present invention improves as compared to the conventional storage system as the number of servers increases.

Although a preferred embodiment of the invention has been described using specific terms, such description is for illustrative purposes only, and it is to be understood that changes and variations may be made without departing from the spirit or scope of the following claims.

Incorporation by Reference

All patents, published patent applications and other references disclosed herein are hereby expressly incorporated by reference in their entireties by reference.

Equivalents

Those skilled in the art will recognize, or be able to ascertain using no more than routine experimentation, many equivalents of the specific embodiments of the invention described herein. Such equivalents are intended to be encompassed by the following claims.

What is claimed is:

1. A data storage system that is adaptable for one of replicating, mirroring or back-up data, said data storage system comprising;
    a first data storage device that includes a memory, a persistent storage disk array and a log-structured file system LSF storage disk where data is saved using LSF techniques;
    wherein the memory is functionally partitioned so as to form discrete memory partitions, a first partition being for buffering data to be stored in the persistent storage disk array and a second partition being for buffering logs to be sequentially written to the LSF storage disk;

wherein the first data storage device is configured and arranged so as to parse I/O requests being transmitted thereto such that the data is in the first partition and the logs are in the second partition; and wherein the first data storage device is configured and arranged so as to perform two writes responsive to each write I/O request, one write of the data to the persistent storage disk array and another subsequent write of the logs to the LSF storage disk such that the memory is relatively small.

2. The data storage system of claim 1, further comprising a second data storage device that is operably coupled to the first data storage device;

wherein the second data storage device includes at least a persistent storage disk array;

wherein the second data storage device is configured and arranged so as to receive data from the LSF device of the first data storage device and for replicating at least some data being stored in the persistent storage disk array of the first data storage device in the persistent storage disk array of the second data storage device.

3. The data storage system of claim 2, wherein:

the second data storage device is configured so as to include a LSF storage disk;

the second data storage device is configured and arranged so that the data from the LSF storage disk of the first data storage device is written to the LSF storage disk of the second data storage device; and the second data storage device is configured and arranged so as to de-stage the data stored in the LSF storage disk of the second data storage device and to write the de-staged data to the persistent storage disk array of the second data storage device.

4. The data storage system of claim 3, wherein the LSF storage disk of the first data storage device includes a cache and a sequentially accessed persistent storage (SAPS) device being operably coupled to the cache, said SAPS device being characterized in that data is stored in a sequential data layout.

5. The data storage system of claim 4, wherein the SAPS device and the persistent storage disk array of the first data storage device is one of one or more magnetic hark disk drives or one or more magneto-optical disk drives.

6. The data storage system of claim 3, wherein the LSF storage disk of the second data storage device includes a cache and a sequentially accessed persistent storage (SAPS) device that is operably coupled thereto, said SAPS device being characterized in that data is stored in a sequential data layout.

7. The data storage system of claim 6, wherein the SAPS device and the persistent storage disk array of the second data storage device is one of one or more magnetic hark disk drives or one or more magneto-optical disk drives.

8. The data storage system of claim 2, wherein the system comprises N first data storage devices and M second storage devices, wherein $N \geq 1$ and $M \geq 1$.

9. The data storage device of claim 8, wherein $N \geq 2$ and $M \geq 2$.

10. The data storage system of claim 2, wherein the system comprises N first data storage devices and M second storage devices and wherein one of N=1 and $M \geq 1$ or $N \geq 1$ and M=1.

11. The data storage system of claim 2, wherein the system comprises N first data storage devices and M second storage devices, wherein $N \geq 1$ and $M \geq 1$ and wherein one of N=M or N≠M.

12. The data storage system of claim 11, wherein an application program in the memory further includes instructions, criteria and code segments for:

controlling reads from the persistent storage disk array, and communicating the read data from the first data storage device to a requestor.

13. The data storage system of claim 11, wherein the LSF storage disk of the first data storage device includes a cache and a sequentially accessed persistent storage (SAPS) device that is operably coupled thereto, said SAPS device being characterized in that data is stored in a sequential data layout, and wherein an application program in the memory further includes instructions, criteria and code segments for:

creating data logs for data being received and written to the LSF storage disk, and buffering the created data logs in the cache.

14. The data storage device of claim 2:

wherein the first data storage device further includes a microprocessor that is operably coupled to the persistent storage disk array and the LSF storage disk and an application program for execution on the microprocessor, and the application program including instructions, criteria and code segments for:

controlling writing to the persistent storage disk array and the LSF storage disk of the first data storage device, controlling communication between a source of the I/O request and the first data storage device, and controlling transmission of data from the first data storage device to the second data storage device; and wherein the second data storage device further includes an LSF storage disk, a microprocessor that is operably coupled to the persistent storage disk array and the LSF storage disk and an application program for execution on the microprocessor, and the application program including instructions, criteria and code segments for:

controlling writing to the LSF storage disk of the second data storage device, and controlling de-staging of data stored in the LSF storage disk to the persistent storage disk array.

15. The data storage system of claim 1, wherein the first data storage device is operably coupled via a network to one or more computers/workstations and wherein the first data storage device is configured and arranged so as to be responsive to received I/O requests transmitted via the network from the one or more computer/workstations.

16. The data storage system of claim 1, wherein:

the first data storage device is operably coupled via a network to one or more computers/workstations and wherein the first data storage device is configured and arranged so as to be responsive to received I/O requests transmitted via the network from the one or more computer/workstations; and wherein the first data storage device is operably coupled to the second data storage device via a network, wherein data being transmitted from the first data storage device to the second data storage device is sent via the network.

17. The data storage system of claim 1, wherein the persistent storage disk array of the first data storage device includes a cache and a persistent storage device being operably coupled to the cache.

18. The data storage device of claim 1, wherein the first data storage device further includes a microprocessor that is operably coupled to the persistent storage disk array and the LSF storage disk and an application program for execution on the microprocessor, and an application program in the memory including instructions, criteria and code segments for:
controlling writing to the persistent storage disk array and the LSF storage disk of the first data storage device, and
controlling communication between a source of the I/O request and the first data storage device.

19. The data storage device of claim 18,
wherein the LSF storage disk of the first data storage device includes a cache and a sequentially accessed persistent storage (SAPS) device being operably coupled to the cache, said SAPS device being characterized in that data is stored in a sequential data layout; and
wherein the application program further includes instructions, criteria and code segments for:
evaluating content of a cache of the LSF storage disk to determine if a condition is satisfied, and
when it is determined that the condition is satisfied, causing the logs in the cache to be sequentially written to the SAPS device.

20. The data storage device of claim 19, wherein the second data storage device includes a persistent storage and wherein the second data storage device is configured and arranged so as to process and to write the transmitted data to the persistent storage disk array of the second data storage device.

21. The data storage device of claim 18,
wherein the LSF storage disk of the first data storage device includes a cache and a sequentially accessed persistent storage (SAPS) device being operably coupled to the cache, said SAPS device being characterized in that data is stored in a sequential data layout; and
wherein the application program further includes instructions, criteria and code segments for:
evaluating content of a cache of the LSF storage disk to determine if a condition is satisfied,
when it is determined that the condition is satisfied, causing the data logs in the cache to be sequentially written to the SAPS device, and
when it is determined that the condition is not satisfied, causing data logs to be continued to be acquired in the cache.

22. The data storage device of claim 18,
wherein the LSF storage disk of the first data storage device includes a cache and a sequentially accessed persistent storage (SAPS) device being operably coupled to the cache, said SAPS device being characterized in that data is stored in a sequential data layout; and
wherein the application program further includes instructions, criteria and code segments for:
transmitting data stored in the SAPS device to a second data storage device.

23. The data storage device of claim 22, wherein the second data storage device includes a persistent storage is configured and arranged so as to process and to write the transmitted data to the persistent storage of the second data storage device.

24. The data storage device of claim 18,
wherein the LSF storage disk of the first data storage device includes a cache and a sequentially accessed persistent storage (SAPS) device being operably coupled to the cache, said SAPS device being characterized in that data is stored in a sequential data layout; and
wherein the application program further includes instructions, criteria and code segments for:
determining if a condition is satisfied for causing data in the SAPS device to be written to a second data storage device, and
when it is determined that the condition is satisfied, causing the data in the SAPS device to be transmitted to the second data storage device.

25. The data storage system of claim 24, wherein the LSF storage disk of the first data storage device includes a cache and a sequentially accessed persistent storage (SAPS) device that is operably coupled thereto, said SAPS device being characterized in that data is stored in a sequential data layout, and wherein the application program including instructions, criteria and code segments for:
creating data logs for data being received and written to the LSF storage disk, and
buffering the created data logs in a cache in the LSF storage disk.

26. The data storage device of claim 24,
wherein the LSF storage disk of the first data storage device includes a cache and a sequentially accessed persistent storage (SAPS) device being operably coupled to the cache, said SAPS device being characterized in that data is stored in a sequential data layout; and
wherein the application program including instructions, criteria and code segments for:
when it is determined that the condition is satisfied, causing the data in the SAPS device to be transmitted to the second data storage device.

27. The data storage device of claim 26, wherein the application program for the second data storage device includes instructions, criteria and code segments for:
evaluating the second data storage device to determine if a condition is satisfied, and
when it is determined that the condition is satisfied, reading the data logs from the SAPS device of the second data storage device, processing the data contained in the data logs and writing the processed data to the persistent storage disk array of the second data storage device.

28. The data storage system of claim 24, wherein the LSF storage disk of the second data storage device includes a cache and a sequentially accessed persistent storage (SAPS) device that is operably coupled thereto, said SAPS device being characterized in that data is stored in a sequential data layout, and wherein the application program including instructions, criteria and code segments for:
processing the transmitted data so as to re-create the logs that were written to the LSF storage disk of the first data storage device, and
buffering the re-created data logs in the cache of the second data storage device.

29. The data storage device of claim 28, wherein said processing of the data includes reformatting the data so as to be in the appropriate format for writing to the persistent storage disk array of the second storage device and ordering the data so as to be in the proper order.

* * * * *